United States Patent [19]

Toyao et al.

[11] Patent Number: 5,599,509
[45] Date of Patent: *Feb. 4, 1997

[54] HONEYCOMB BODY AND CATALYST CONVERTER HAVING CATALYST CARRIER CONFIGURED OF THIS HONEYCOMB

[75] Inventors: Tetsuya Toyao, Toyoake; Toshiki Matsumoto, Kariya; Hiromasa Aoki, Nagoya; Tatsuya Fujita; Senta Tojo, both of Kariya, all of Japan

[73] Assignee: Nippondenso Co., Ltd., Kariya, Japan

[ * ] Notice: The portion of the term of this patent subsequent to Mar. 16, 2014, has been disclaimed.

[21] Appl. No.: 416,578

[22] Filed: Apr. 4, 1995

Related U.S. Application Data

[63] Continuation-in-part of Ser. No. 213,806, Mar. 16, 1994.

[30] Foreign Application Priority Data

Mar. 17, 1993 [JP] Japan ........................ 5-56908
Dec. 27, 1993 [JP] Japan ........................ 5-350447
Oct. 4, 1994 [JP] Japan ........................ 6-240231

[51] Int. Cl.$^6$ ................ B01D 53/34; B01J 35/04; F01N 3/10
[52] U.S. Cl. .......... 422/180; 422/177; 422/179; 422/211; 422/221; 422/282; 60/297; 502/439; 502/527
[58] Field of Search .................. 422/169–170, 422/177, 179, 180, 211, 221, 222; 502/439, 527; 428/593; 60/299

[56] References Cited

U.S. PATENT DOCUMENTS

| | | | |
|---|---|---|---|
| 3,016,108 | 1/1962 | Myddelton | 422/177 |
| 3,975,826 | 8/1976 | Balluff | 422/180 |
| 4,152,302 | 5/1979 | Nonnenmann et al. | 423/213.5 |
| 4,162,993 | 7/1979 | Retallick | 428/592 |
| 4,186,172 | 1/1980 | Scholz | 422/180 |
| 4,282,186 | 8/1981 | Nonnenmann et al. | 422/180 |
| 4,400,860 | 8/1983 | Nonnenman et al. | 29/890 |
| 4,519,120 | 5/1985 | Nonnenmann et al. | 29/890 |
| 4,647,435 | 3/1987 | Nonnenmann | 422/180 |
| 4,753,918 | 6/1988 | Cyron | 502/439 |
| 4,886,711 | 12/1989 | Foldvary | 428/527 |
| 4,958,428 | 9/1990 | Humpolik | 29/890 |
| 4,987,034 | 1/1991 | Hitachi et al. | 428/593 |
| 5,079,210 | 1/1992 | Kaji et al. | 502/439 |
| 5,080,953 | 1/1992 | Horikawa et al. | 502/527 |
| 5,108,716 | 3/1992 | Nishizawa et al. | 502/527 |
| 5,278,125 | 1/1994 | Iida et al. | 502/439 |
| 5,328,774 | 7/1994 | Maus et al. | 422/180 |
| 5,403,559 | 4/1995 | Swars | 422/180 |
| 5,436,216 | 7/1995 | Toyao et al. | 422/174 |

FOREIGN PATENT DOCUMENTS

| | | |
|---|---|---|
| 8908738 | 9/1989 | Germany . |
| 2223622 | 9/1990 | Japan . |
| 371177 | 11/1991 | Japan . |
| 462316 | 5/1992 | Japan . |
| 453450 | 5/1992 | Japan . |
| 478939 | 7/1992 | Japan . |
| 478938 | 7/1992 | Japan . |
| 557197 | 3/1993 | Japan . |
| 5184938 | 7/1993 | Japan . |
| 92/02716 | 2/1992 | WIPO . |
| 92/13635 | 8/1992 | WIPO . |

Primary Examiner—Robert J. Warden
Assistant Examiner—Hien Tran
Attorney, Agent, or Firm—Cushman Darby & Cushman IP Group of Pillsbury Madison & Sutro LLP

[57] ABSTRACT

In a metal catalyst converter configured of the metal catalyst carrier that holds the catalyst into the honeycomb body created by alternately winding flat sheet and corrugated sheet, a plurality of slit matrix that extend in the direction perpendicular to the exhaust gas direction were arranged on at least one part of the upstream side of the exhaust gas passage. By that a low heat capacity and high heat transfer area in regard to the downstream side of the exhaust gas passage was formed. The upstream portion of the metal catalyst converter on which slit matrix was formed was configured to be covered by outer casing having an air insulation layer. The upstream side of this outer casing was held and fixed to the exhaust gas passage.

28 Claims, 26 Drawing Sheets

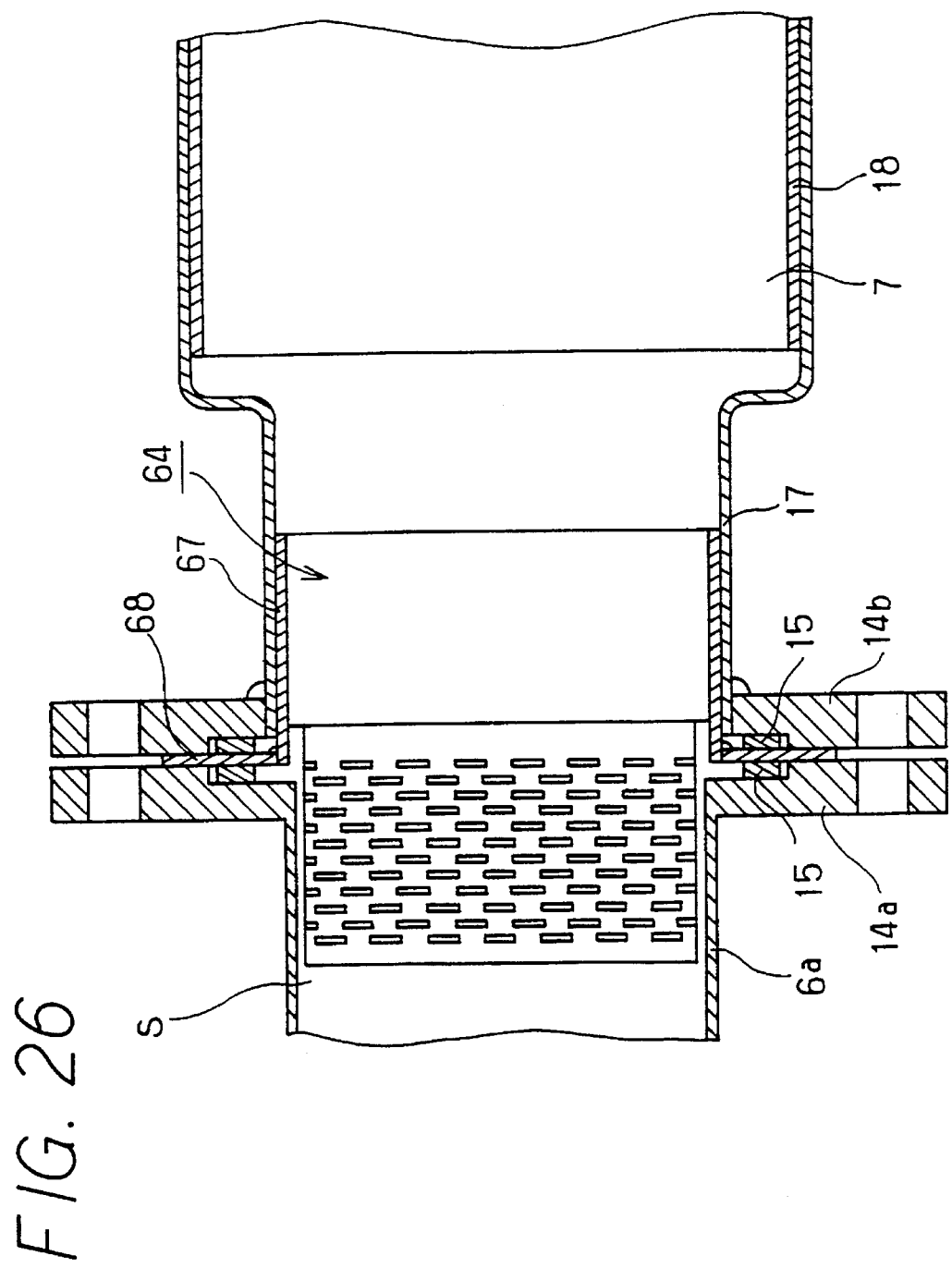

HONEYCOMB BODY AND CATALYST CONVERTER HAVING CATALYST CARRIER CONFIGURED OF THIS HONEYCOMB

CROSS REFERENCE TO RELATED APPLICATION

This is a continuation-in-part application of U.S. application Ser. No. 213,806 filed Mar. 16, 1994, entitled METAL CARRIER by Toshiki Matsumoto et al.

BACKGROUND OF THE INVENTION

1. Field of the Invention

The present invention generally relates to a catalyst converter having honeycomb body of which temperature can rise at an early stage and a catalyst carrier which holds a catalyst capable of creating an oxidation-reduction reaction with the toxic elements in the exhaust gas, and of which temperature can rise at an early stage to the activation temperature where catalyst held in the catalyst carrier can perform catalyst functions to purify exhaust gas of automobiles, etc.

2. Description of the Related Art

Conventionally, as means to convert the toxic elements such as CO, and HOx found in the exhaust gas of automobile engines into harmless vapors (such as CO2) or water, a metal catalyst converter that was a catalyst converter comprising a metal catalyst carrier was intervened in the honeycomb placed inside the exhaust gas passage. With these means, the exhaust gas was purified.

Metal catalyst carriers formed by winding or laminating metal foil flat sheets or corrugated sheets are disclosed in the Japanese Utility Model Application Laid-Open No. 4-62316. However, with the metal catalyst carrier disclosed in Japanese Utility Model Application Laid-Open No. 4-62316 a problem existed. When the exhaust gas temperature at the initial engine running state was low, the catalyst properties were not activated, and the exhaust gas was not purified. This was caused because the heat capacity of the metal catalyst carrier itself was extremely large, it took a long time for the held catalyst to rise to the active temperature by just the heat transfer of the exhaust gas heat.

To resolve this problem, Japanese Utility Model Application Laid-Open No. 2-223622 proposed installing a catalyst converter comprising a self-heating type metal catalyst carrier besides the main catalyst converter to activate the catalyst properties by conducting and heating the self-heating metal catalyst carrier. However, a large power exceeding 1 kW is required for this type of catalyst converter, and thus the efficiency is extremely poor.

Furthermore, the metal catalyst carrier for automobiles is installed in the engine exhaust gas passage and is direct subjected to exhaust gases that exceed 900° C. Thus, a repeated function of thermal expansion and contraction is applied. Thus, a metal catalyst carrier provided with slits on the entire metal foil flat sheet and corrugated sheet to absorb the thermal expansion and contraction was disclosed in Japanese Utility Model Application Laid-Open No. 3-71177.

However, with the metal catalyst carrier disclosed in Japanese Utility Model Application Laid-Open No. 3-71177, as fine long slits are formed throughout the flat sheet and corrugated sheet to extend in the direction that crosses with the exhaust gas direction, not only does the rigidity of the metal catalyst carrier itself drop, but also the characteristic frequency drops making it extremely difficult to secure the reliability in regard to the engine vibration. Furthermore, the metal catalyst carrier may break when the strength of the metal drops remarkably at high temperatures exceeding 900° C.

Furthermore, as slits are arranged throughout the metal foil flat sheet and corrugated sheet that configure the metal catalyst carrier, it is extremely difficult to join the flat sheet and corrugated sheet, making complicated manufacturing device, and causing difficulties in inexpensive manufacturing.

SUMMARY OF THE INVENTION

An object of this invention is to provide carrier structure having a high heat transfer efficiency to efficiently transfer the exhaust gas heat to the entire honeycomb, an easy-to-manufacture honeycomb body with a very small heat capacity and high reliability, and a catalyst converter configured of this honeycomb body.

Another object of this invention is to provide an inexpensive honeycomb body and catalyst carrier having a high reliability that can raise the temperature of the held catalyst to the activation temperature without using electrical means in a short time after the engine is started.

To achieve the objects of this invention, a honeycomb body arranged in the exhaust gas passage of an engine, has a low heat capacity area formed at the upstream side of the exhaust gas passage. The area is smaller in capacity than the downstream side of the exhaust gas passage. A catalyst converter uses this honeycomb body.

It is preferable that the honeycomb body be configured by alternately winding or laminating metal flat sheets and/or corrugated sheets, and a slit matrix having openings created by a plurality of slits that extend perpendicular to the direction of the exhaust gas which flows through said exhaust gas passage is formed at the upstream side of the flat sheet and/or corrugated sheet exhaust gas passage.

It is also preferable that the aspect ratio h:W of each slit be 1:5 or less.

A catalyst converter has a catalyst carrier arranged in exhaust gas passage or engine wherein the catalyst that causes an oxidation-reduction reaction with toxic elements in exhaust gas emitted from the engine is held, and wherein low heat capacity area is formed only at the upstream side of the exhaust gas passage, the area is smaller in heat capacity than the downstream side of the exhaust passage, and wherein outer casing having an air insulation layer space at the area corresponding to the low heat capacity area of the catalyst carrier is formed.

It is also preferable that the catalyst converter have a plurality of openings formed in a slit matrix on the outer casing with intervals in the circumference direction on at least part of the portion that joins with the catalyst carrier, wherein the openings can thermally deform in the direction that the catalyst carrier radially expands and contracts.

It is also preferable that the catalyst carrier be formed by winding or laminating flat sheets and/or corrugated sheets, and that the flat sheet and/or corrugated sheet joining section by joined at the non-slit matrix portion near the upstream and downstream sides of the slit matrix that creates the low heat capacity area, and at the axial cross section of the catalyst converter including the air insulation layer portion that does not contact the outer casing.

This invention relates to the metal catalyst carrier comprising the above configuration and characteristics.

According to the present invention with the configuration, as a low heat capacity area, of which heat capacity is smaller than downstream side of exhaust gas passage, is formed on the upstream side of the exhaust gas passage in the honeycomb, the temperature of the honeycomb body can be easily raised by the exhaust gas from the engine.

By forming this low heat capacity area, the heat transfer efficiency for the entire honeycomb is high, and the radius direction and axial direction heat transfer amount of the honeycomb body can be small. Thus, a honeycomb body with an outstanding effect for keeping the heat of which temperature has been raised is achieved.

By forming an air insulation area in the area corresponding to the low heat capacity area and creating an insulated structure, discharge of the heat of which temperature was raised in the low heat capacity area to the outside along the outer casing can be prevented.

Thus, a structure that easily raises the temperature of the catalyst carrier by the exhaust gas heat only is achieved and the temperature rasing efficiency can be improved with an extremely small amount of the heat being discharged to the outer casing.

As explained above, when the temperature of the low heat capacity area at the upstream side is raised, the transfer of heat to the downstream side of the exhaust gas passage on the honeycomb body starts. The heat capacity of the downstream side of the exhaust gas passage is larger than the upstream side exhaust gas passage, so the heat transfer is high, and the heat of which temperature is raised at the upstream side of the exhaust gas passage is quickly transferred to the down stream side of the exhaust gas passage allowing the entire honeycomb to be easily heated.

A slit matrix having openings formed by a plurality of slits extending in the direction perpendicular to the direction of the exhaust gas is formed in this low heat capacity area. When the-temperature of the slit matrix on the upstream side of this exhaust gas passage rises, the transfer of the heat to the downstream side of the exhaust gas passage on the honeycomb starts. As there is non-slit matrix portion on the downstream side of this exhaust gas passage, the heat transfer is high, and as the catalyst reaction heat is also applied, the heat of which temperature was raised at the upstream side is quickly transferred to the downstream side, and the temperature of the honeycomb can be raised easily. On the other hand, the structure ensures that the honeycomb strength is sufficient.

In other words, as slits having a small aspect ratio are formed for the slits that configure the slit matrix, the honeycomb body can be configured without dropping the characteristic frequency in the axial and radial directions. Thus, the durability is outstanding.

Furthermore, as the heat capacity of the upstream side of the exhaust gas passage in the catalyst carrier is smaller than the heat capacity of the downstream side of the exhaust gas passage, when the temperature of the low heat capacity area on the upstream side of the exhaust gas passage rises, the transfer of the heat to the downstream side of the catalyst carrier starts. Since the heat capacity of the downstream side is larger than the upstream side of the exhaust gas passage, the heat transfer is high and as the catalyst reaction heat is also applied, the heat amount of which temperature is raised at the upstream side is swiftly transferred to the downstream side. As a result, the entire catalyst carrier area easily reaches the catalyst activation temperature.

This allows an exhaust gas reaction area that can sufficiently purify the exhaust gas immediately after the engine is started to be achieved in a short time. As multiple openings are formed with intervals in the circumferential direction on the outer casing at the downstream side that contacts the metal catalyst carrier, the openings can thermally deform in the radial thermal expansion and contraction direction of the metal catalyst carrier, and the radial direction thermal strain that occurs on the joining section of the outer casing and metal catalyst carrier is also small.

As the flat sheets and corrugated sheets that configure the metal catalyst carrier are joined at the nonslit matrix portion, the peak of the corrugated sheet can be easily and inexpensively joined to the flat sheet with laser welding, resistance welding or brazing, etc. The flat sheets and corrugated sheets that configure the metal catalyst carrier area joined at the upstream and downstream sides that sandwich the slit matrix that does not contact the outer casing. As the outer casing and welded sections do not directly contact, the thermal gradient in the radius direction of the catalyst carrier is extremely small. Thus, the thermal strain of the metal catalyst carrier that occurs in the cooling/heating cycle by the engine up/down can be reduced. Furthermore, as the outer casing is joined with the metal catalyst carrier only near the downstream end, the axial direction thermal stress that occurs at this joining section is extremely small.

BRIEF DESCRIPTION OF THE DRAWINGS

FIG. 26 is a partial cross-sectional view illustrating the structure for holding the metal catalyst converter according to the fifth embodiment;

DETAILED DESCRIPTION OF THE PRESENTLY PREFERRED EXEMPLARY EMBODIMENTS (First Embodiment)

The first embodiment according to the present invention will be described in reference to FIGS. 1 to 8.

The metal catalyst carrier 10 in the first embodiment is configured of alternately layering flat sheet 2 and corrugated sheet 3 of heat resistant stainless steel and winding them in a spiral shape. Both the flat sheet 2 and corrugated sheet 3 are band-shaped heat resistant stainless steel foil having a width of 60 mm and thickness of 0.03 to 0.20 mm, and composed of Fe—Cr—Al composition, in detail, composed of chrome (Cr, 18 to 24 wt %), aluminum (Al, 4.5 to 5.5 wt %), rare earth metal elements (REM, 0.1 to 0.2 wt %) and remaining iron (Fe).

Figure 4:
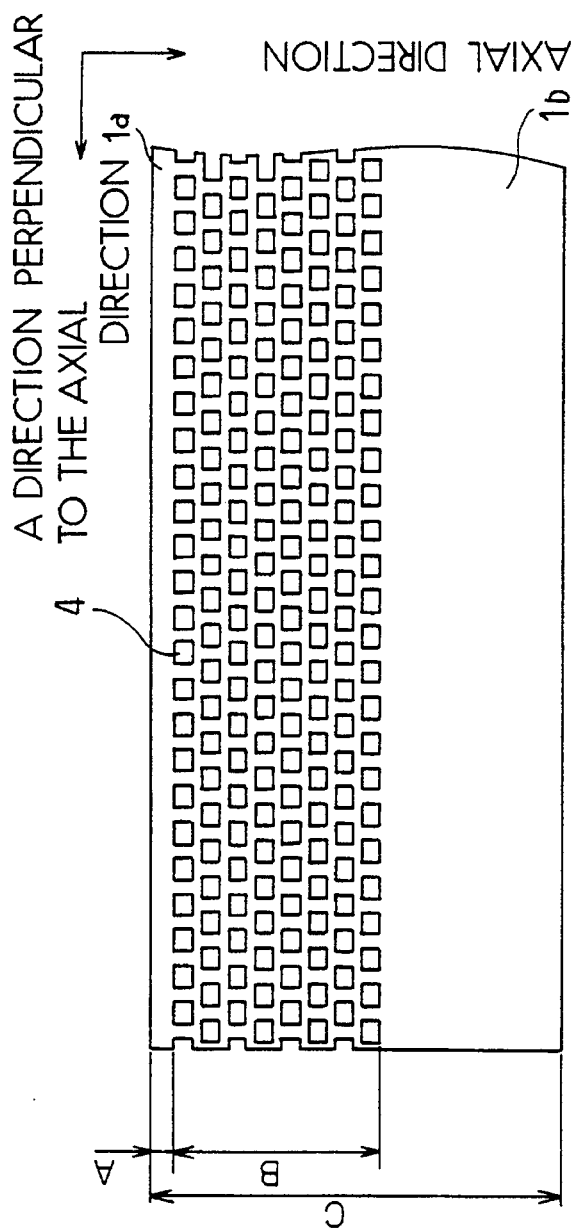
FIG. 4 is a development view illustrating the flat sheets and corrugated sheets used in the metal catalyst converter according to the first embodiment.
Figure 5:
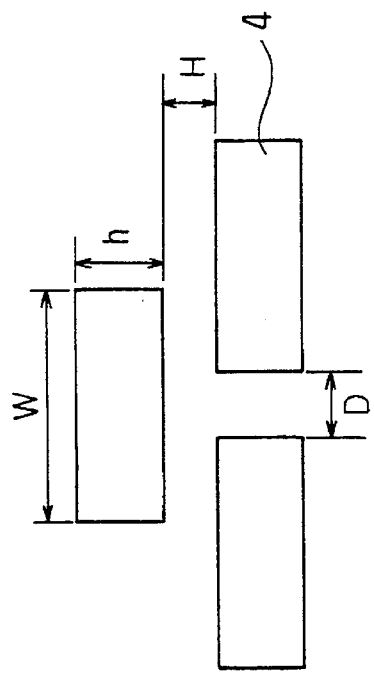
FIG. 5 is a partially enlarged view of the slit portion used in the first embodiment.

As illustrated in FIG. 4, slit matrix having a plurality of slits 4 are formed on the flat sheet 2 and corrugated sheet 3. The slits 4 have an approximate rectangular shape. The slit matrix starts from distance A (3 mm in this embodiment) from the one end of the sheet by a slit matrix width B (31.2 mm in this embodiment) to extend to the other end of the sheet. As illustrated in FIG. 5 the dimensions of the slit matrix are 3 mm in width W and 1.2 mm in height h. The slits are formed continuously in staggered pattern.

Furthermore, adjacent slits are formed with an interval H=0.8 mm in the axial direction of the metal catalyst carrier 10, and an interval of adjacent slits arranged in the direction perpendicular to the axial direction D=1 mm in perpendicular to the axial direction of the metal catalyst carrier 10. Furthermore, adjacent slits arranged in the axial direction are offset by a distance of (W+D)/2 to a direction perpendicular to the axial direction of the metal catalyst carrier 10. The low heat capacity area is formed by the formation of this slit matrix.

The flat sheet 2 and the corrugated sheet 3 with a pitch of 4.9 mm and height of 1.7 mm are, after winding, installed so that the slit matrix is arranged on the upstream side of the exhaust. At this time, the flat sheet 2 and corrugated sheet 3 are joined at the non-slit matrix portions 1a and 1b near both ends of the slit matrix upstream and downstream sides with laser welding, resistance welding or brazing.

Figure 1:
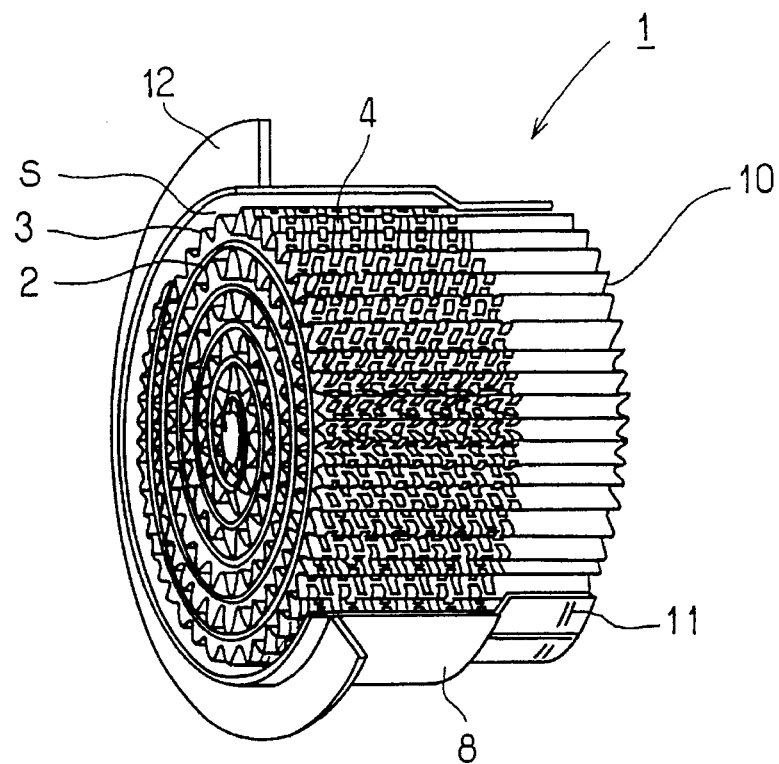
FIG. 1 is a partially cutaway view illustrating the metal catalyst converter according to the first embodiment.

As illustrated in FIG. 1, an outer casing 8 is shaped so that a clearance section S, which is an air insulation layer of which the radial length has a width of 1.5 mm almost equal to the corrugated sheet height in regard to the slit matrix on the upstream side of the metal catalyst carrier 10 is formed.

Eight openings 8a are formed at 45° intervals in the circumferential direction on the downstream side of the outer casing 8 that contacts the metal catalyst carrier 10.

A laser beam is radiated from an outer portion other than the opening 8a portion at the downstream side end to weld the metal catalyst carrier 10 and outer casing 8. Brazing can be used instead of a welding method. The metal catalyst converter 1 of the first embodiment is configured with this outer casing 8 and metal catalyst carrier 10.

Figure 2:
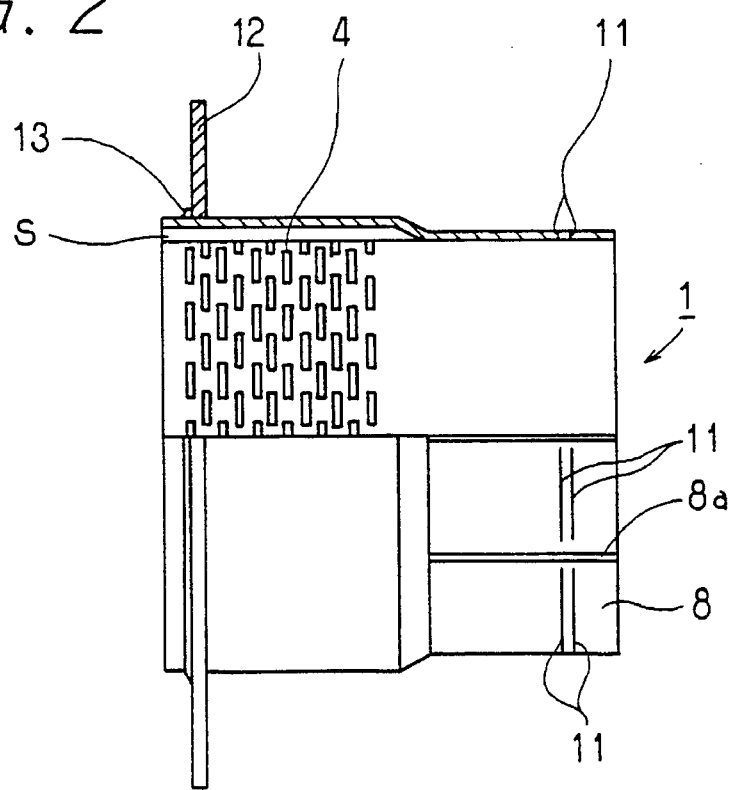
FIG. 2 is a front view illustrating the metal catalyst converter according to the first embodiment.
Figure 3:
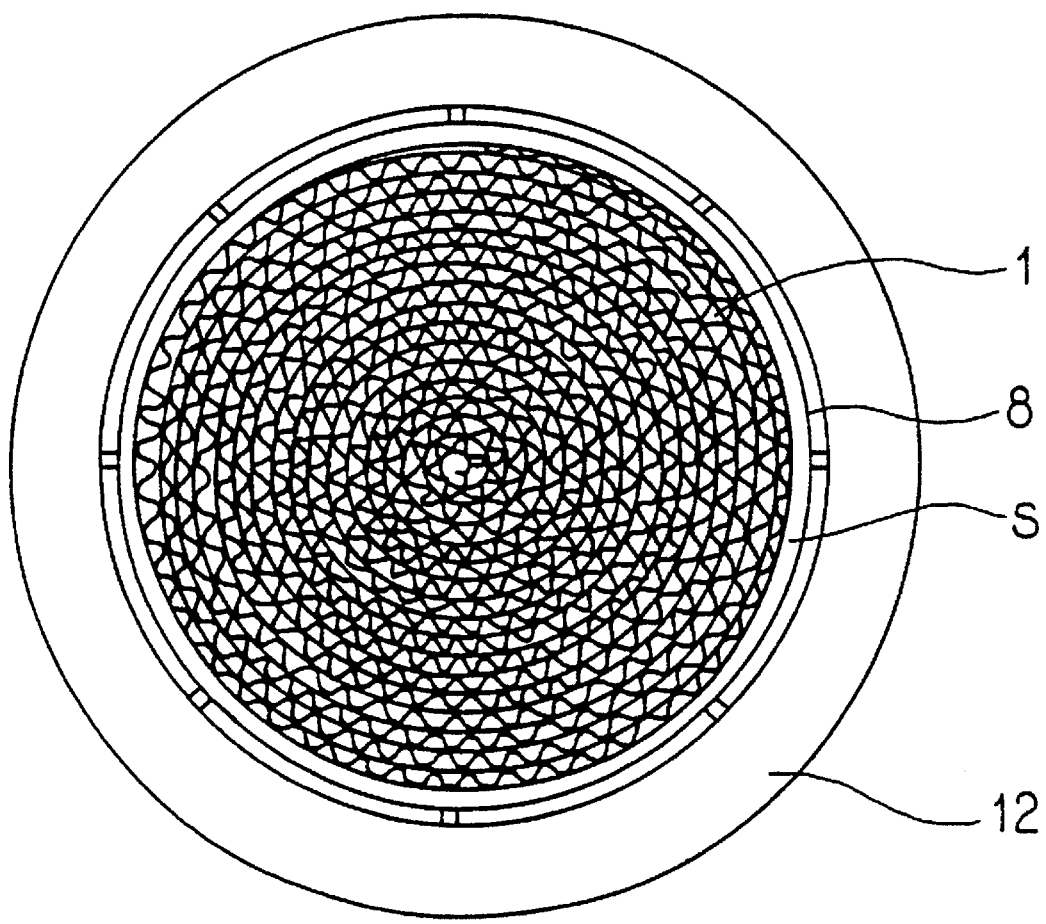
FIG. 3 is a right view illustrating the metal catalyst converter according to the first embodiment.

Numeral 11 in FIGS. 1 and 2 illustrates welding marks when laser welding is done. To prevent welding cracks in the foil material caused by the heat capacity difference in the foil material and outer casing 8 during laser welding, the outermost layer of the metal catalyst carrier 10 uses two layered corrugated sheets 3. When brazing, flat plates should be used to ensure a sufficient welding area.

The disc-shaped flange 12 is welded and fixed to the upstream side of the outer casing 8 where the space portion S is formed. 13 illustrates the welding mark. This outer casing 8 and flange 12 are made of heat-resistant stainless steel SUS430 (Japanese Industrial Standard), and the same material is used for both portions. By using the same material for the flat sheet 2 and corrugated sheet 3, a better weld-ability can be achieved.

To ensure a high weld-ability when welding outer casing 8 and flange 12, an oxidation film is formed on the welding surface by γ-Al$_2$O$_3$ coating described later. This oxidation film should be formed before the catalyst holding process.

Next the method for holding the catalyst in the honeycomb body and obtaining the metal catalyst carrier 10 will be described.

The metal catalyst carrier 10 is made by heating a honeycomb body to which the outer casing has been welded at 800° to 1299° C. for one to ten hours and precipitating an Al oxidant on the metal surface of the honeycomb. The body is then impregnated in slurry containing γ-Al$_2$O$_3$, and is baked.

Then the body is re-baked in a water-solution in which a catalyst metal such as Pt or Rh has been dissolved. In this case, the heat treatment before the γ-Al$_2$O$_3$ coating is done to suppress the peeling of the γ-Al$_2$O$_3$ coat and is a process to generate alumina whiskers on the metal foil and increase the foil surface area on the honeycomb body. A high reliability can be achieved with this process.

Next, by welding the outer casing 8 to which the flange 12 has been installed to the metal catalyst carrier 1, the metal catalyst converter 1 can be used as a catalyst converter that can be installed in the exhaust gas passage of an automobile.

Figure 6:
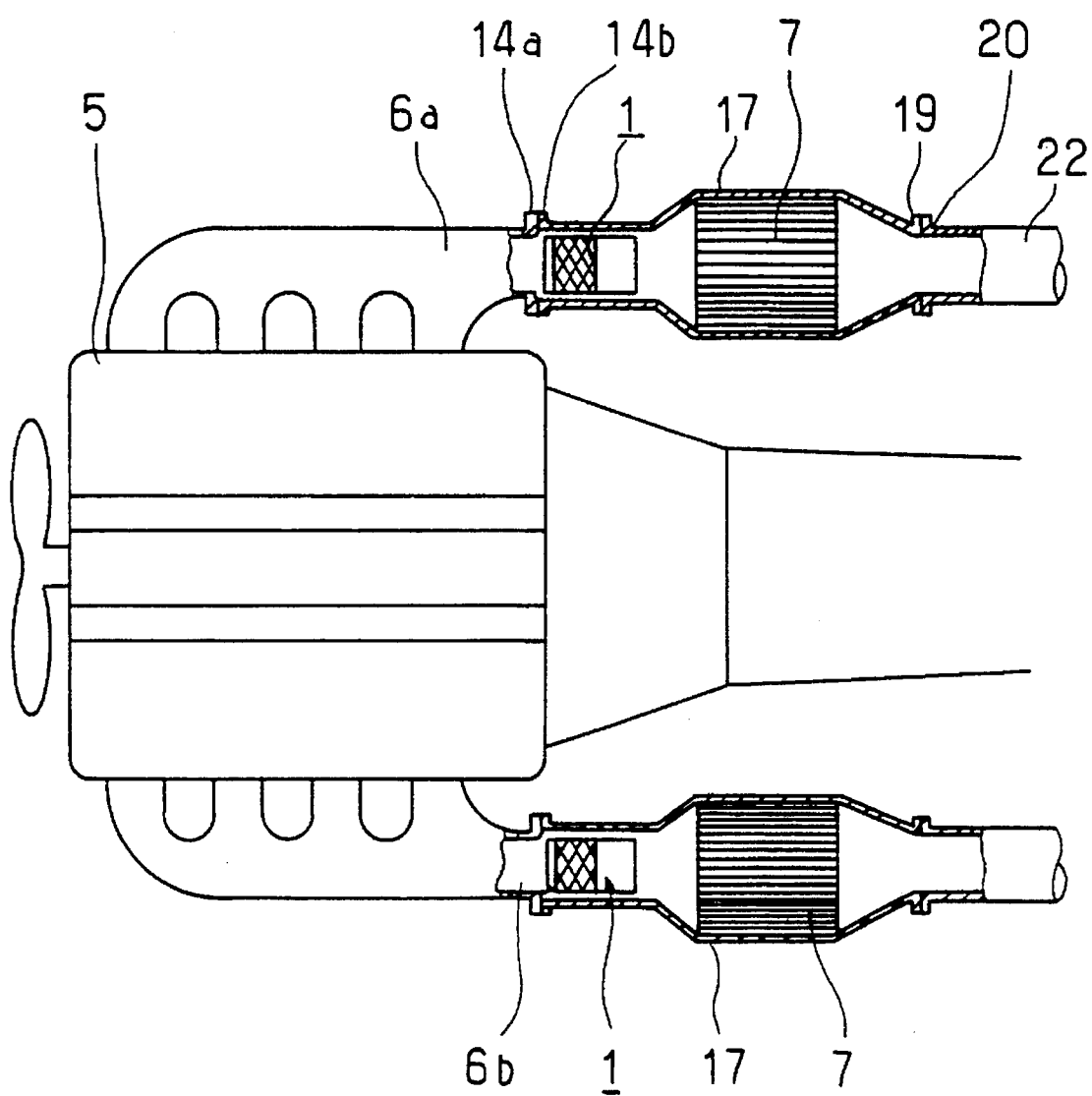
FIG. 6 is an outline configuration view of the engine in which the metal catalyst converter according to the first embodiment is mounted.
Figure 7:
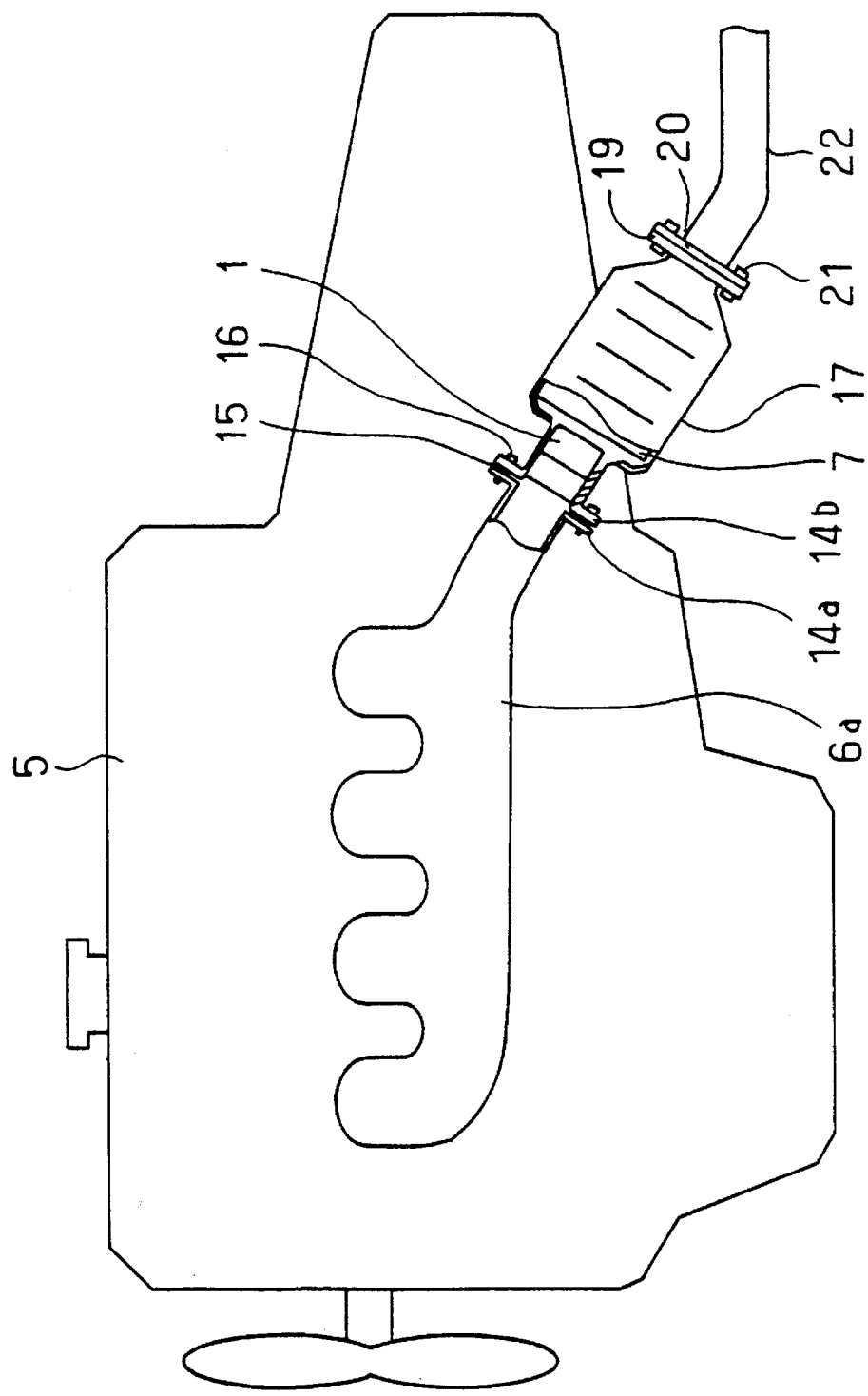
FIG. 7 is a front view of the engine in which the metal catalyst converter according to the first embodiment is mounted.
Figure 8:
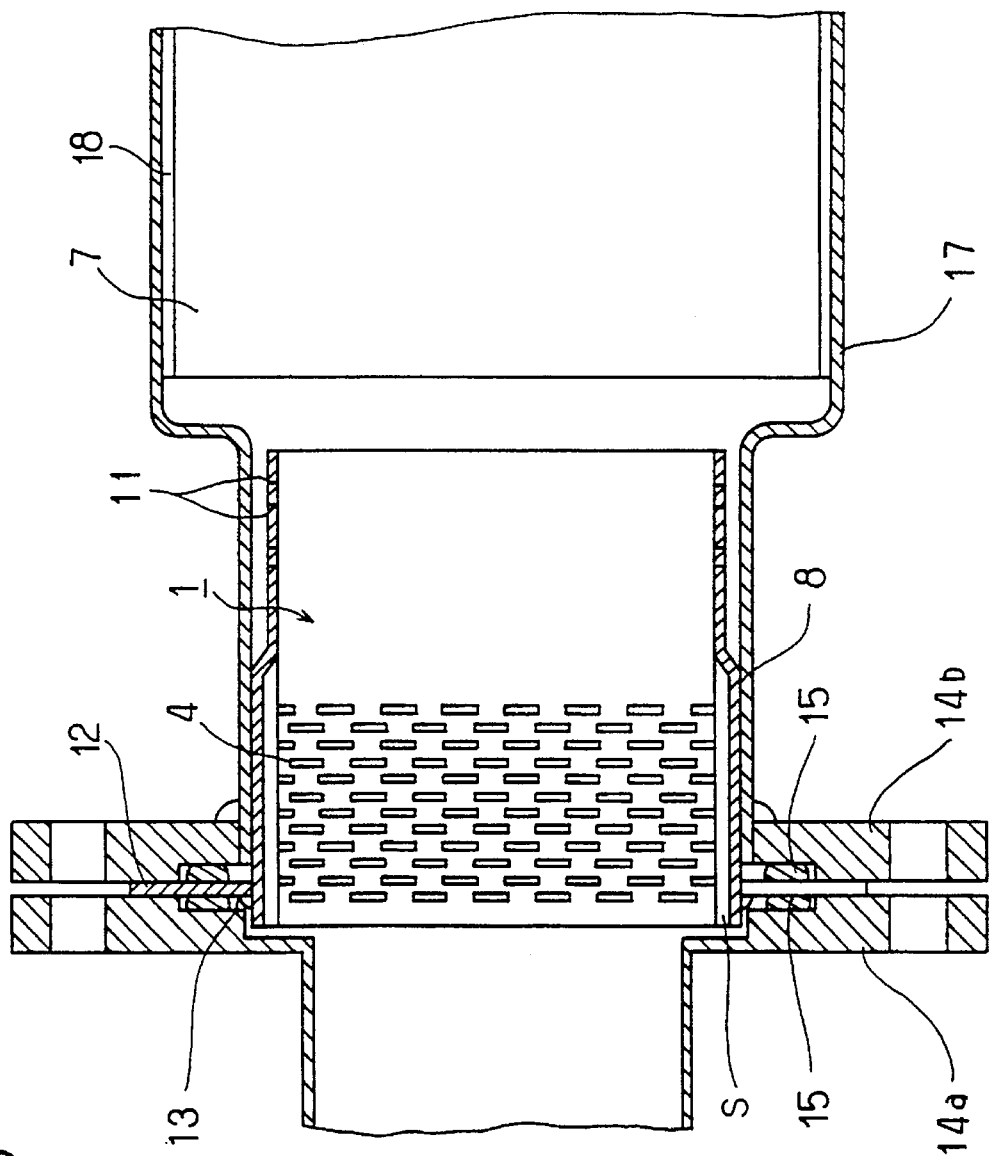
FIG. 8 is a partial cross-sectional view illustrating the structure for holding the metal catalyst converter according to the first embodiment.

This metal catalyst converter 1 is fixed and held in the exhaust manifolds 6a and 6b as illustrated in FIGS. 6 and 8. In other words, the flange 12 coupled and fixed with the metal catalyst converter 1 between the exhaust manifold installation flange 14a and start catalyst installation flange 15b via gasket 15 is fixed and held by bolt 16, and the metal catalyst carrier is fixed and held in the exhaust manifolds 6a and 6b. In the first embodiment, engine 5 is a V8 4000 cc engine as shown in FIG. 7. The eight exhaust manifolds led out from this engine 5 are grouped in groups of four manifolds to create the exhaust manifolds 6a and 6b. In the middle of each exhaust manifold 6a and 6b, a metal catalyst converter 1 fixed and held and a start catalyst 7, a ceramic monolithic catalyst carrier having a capacity of 1300 cc, is arranged on the downstream side.

The start catalyst 7, a monolithic catalyst carrier, is fixed and held with a wire net or ceramic fiber mat 18 in the outer casing 17 for the start catalyst. The downstream side flange 19 and exhaust pipe flange 20 for the start catalyst are coupled and integrated by bolt 21. After the exhaust pipe 22 is centralized into one at the downstream side, a 1000 cc main catalyst (not illustrated) is arranged.

Figure 9:
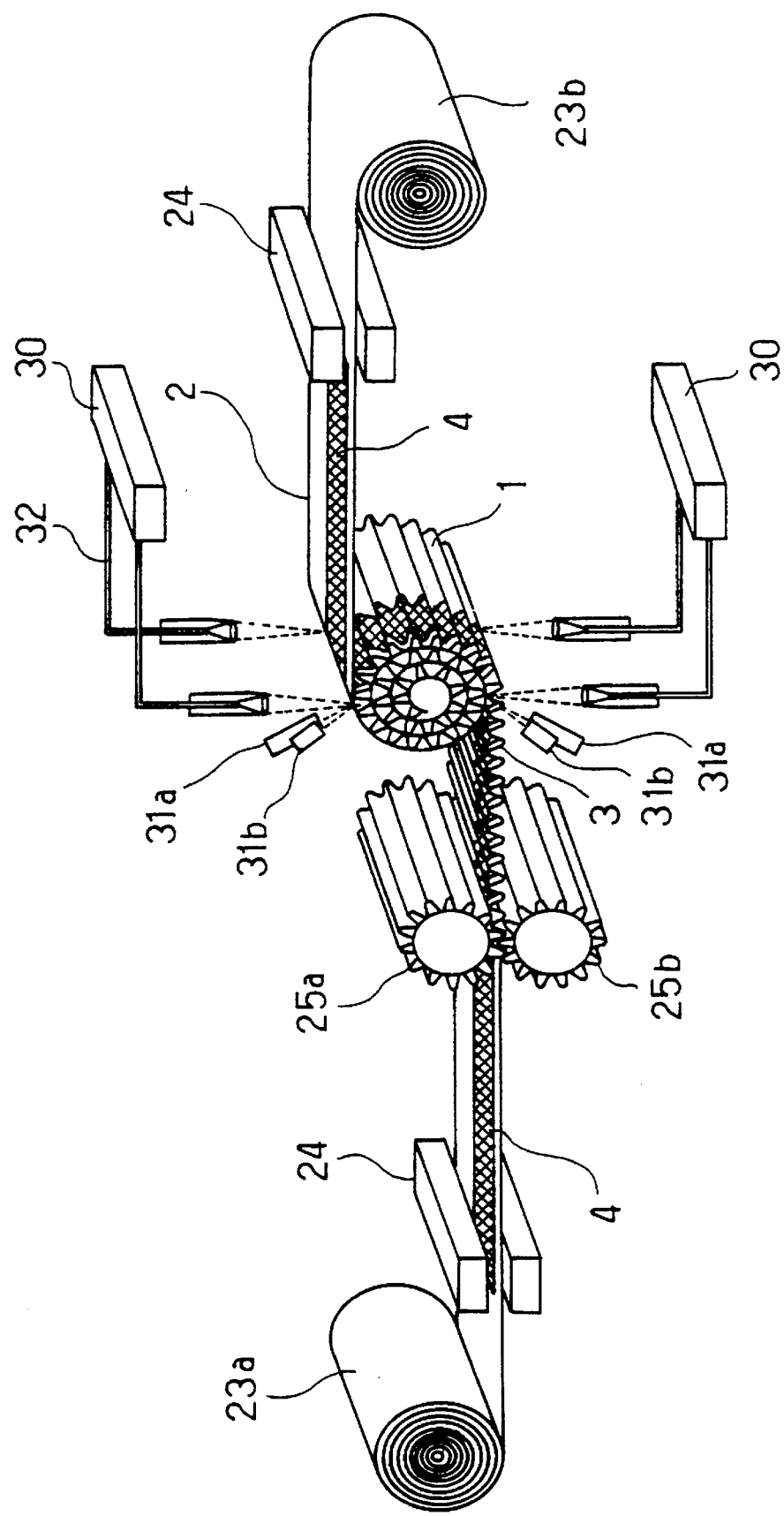
FIG. 9 is a simulation view of the manufacturing device for manufacturing the metal catalyst carrier according to the first embodiment.

Next, the method for manufacturing the metal catalyst carrier 10 will be described. FIG. 9 illustrates the winding device 35 that slits the flat sheet 2, forms the corrugated sheet 3, winds the flat sheet 2 and corrugated sheet 3, and laser welds the metal catalyst carrier 10.

Figure 10:
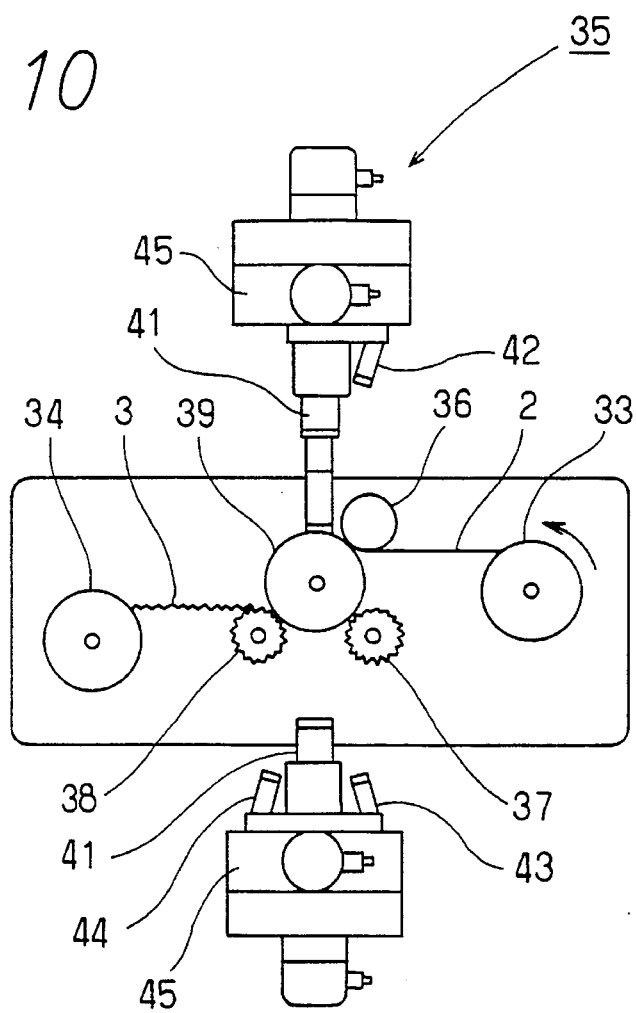
FIG. 10 is a front view of the manufacturing device for manufacturing the metal catalyst carrier according to the first embodiment.
Figure 11:
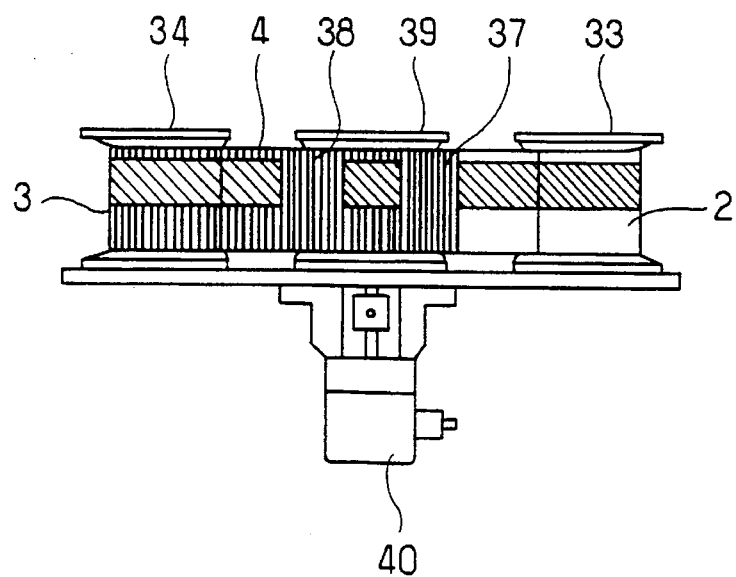
FIG. 11 is a top view of the manufacturing device for manufacturing the metal catalyst carrier according to the first embodiment.
Figure 12:
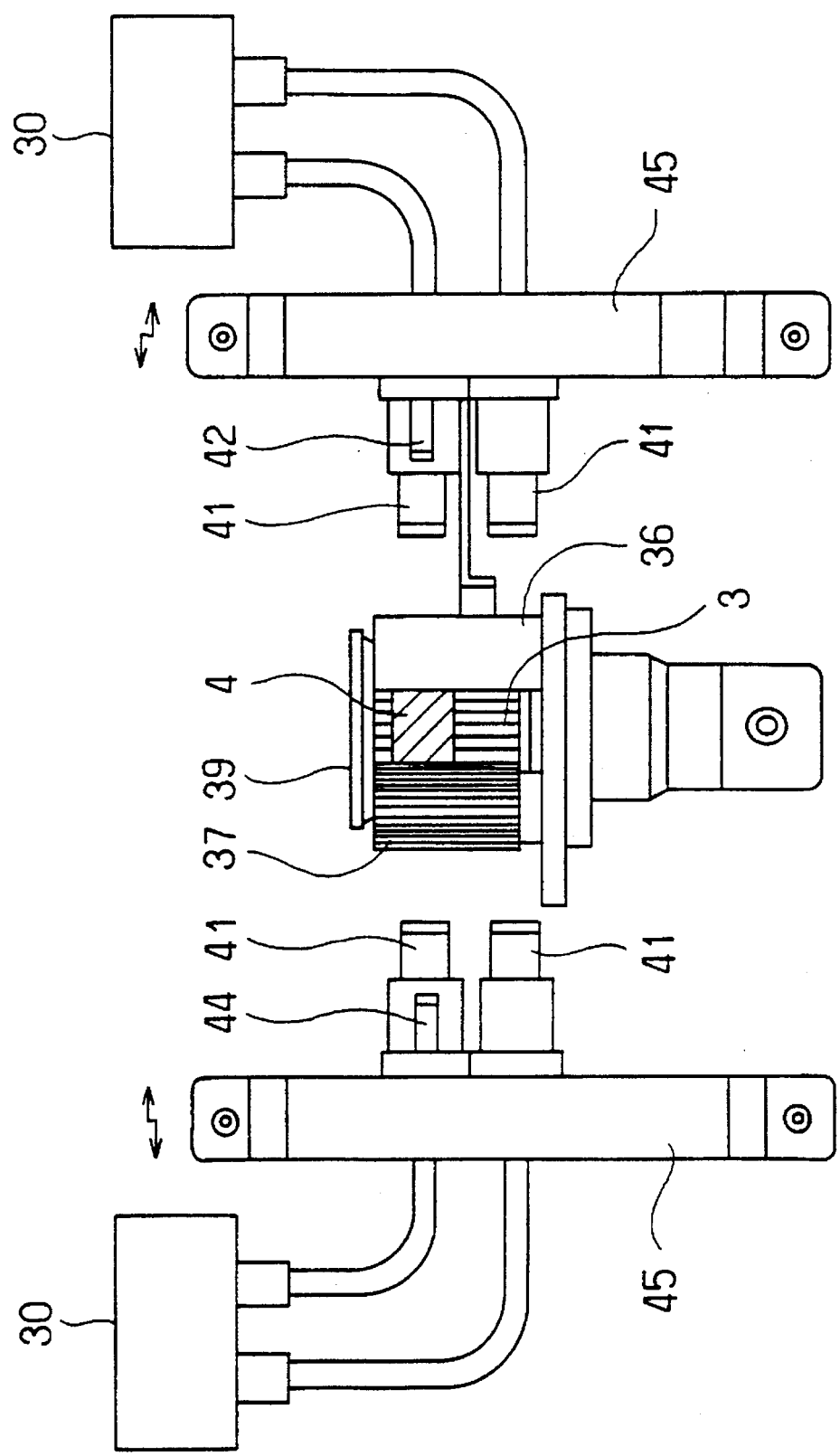
FIG. 12 is a right view of the manufacturing device for manufacturing the metal catalyst carrier according to the first embodiment.

FIG. 10 is the front view of the winding device 35 that winds and laser welds the flat sheet 2 and corrugated sheet 3. FIG. 11 is a plane view and FIG. 12 is a view from the right side. First, the material foil 23a and 23b are prepared at the left and right sides of the winding device 35.

The material foil is guided from the material foil 23a and 23b set at the left and right sides, and the slits 4 are formed on both material foils by the press machine 24. After that, the material foil 23a is corrugated by the corrugating rollers 25a and 25b, and finally, the corrugated sheet 3 and flat sheet 2 are wound to the designated dimension to obtain the metal catalyst carrier 10.

At this time, the flat sheet 2 and corrugated sheet 3 are laser welded by the Y.A.G. laser welding machine 30 from the top and bottom at the crest and root. Numerals 31a and 31b are the laser displacement gauges for detecting the welding section. 31a is the laser projection section, and 31b is the reception portion. Numeral 32 is an optical fiber cable used to branch the laser beam radiated from the Y.A.G. laser welding machine 30.

The actual winding and laser welding methods will be described in the following section.

The flat sheet 2 is guided to the center of the winding machine 35 by the flat sheet guide 33, and the corrugated sheet 3 is guided to the center by the corrugated sheet guide sheet 34. These are then guided to guide sheet 39 by the tension rollers 36 for the flat sheet 2 controlling, and the tension rollers 37 and 38 for the corrugated sheet controlling. This guide sheet 39 is driven by the motor 40 illustrated in FIG. 11, and the flat sheet 2 and corrugated sheet 3 are wound by being laminated.

At this time, the flat sheet 2 and corrugated sheet 3 are laser welded by the Y.A.G. laser 30 while being wound. 41 is the laser radiation port. Here in FIG. 10, an example where the laser beam from each laser welding machine 30 is branched into two by the optical fiber cable 32 and the flat sheet 2 side and corrugated sheet 3 side are each welded by two radiation ports 41 was illustrated. However, the number of branches can be increased as necessary.

The laser welding is done at the contacts of the flat sheet 2 and corrugated sheet 3 crests, so accurate position detection is required. For this purpose, the winding device 35 has the three laser displacement sensors 42, 43 and 44 to detect the laser welding position. These three laser displacement sensors 42, 43 and 44 incorporate compact laser displacement sensors set inside the same lens of the projecting and receiving portions. However, a non-contact sensor such as an overcurrent type displacement sensor or a contact type displacement sensor can be used instead of the laser displacement sensor.

The servomotor (not illustrated) is driven according to these detection signals, and the X-Y table 45 which fixes the laser radiation ports is moved accordingly. In other words, the laser displacement sensor 42 detects the gap between the laser radiation port 41 and metal catalyst carrier 10, and the detection signal is sent to the servomotor (not illustrated). The laser displacement sensor 43 detects the gap between the laser radiation port 41 and the corrugated-shape valley formed in the corrugated sheet 2, and sends the detection signal to the servomotor (not illustrated). The laser displacement sensor 44 detects the position of the corrugated-shaped crest formed in the corrugated sheet 2 at a position always deviated a half pitch and sends the detection signal to the servomotor (not illustrated). The laser displacement sensors 42, 43 and 44 detect the portions where the peak of the corrugated-shaped crest formed in the corrugated sheet 3 and the flat sheet 2 are detected, and sends the detection signal to the servomotor (not illustrated). Then based on these detection signals the position of the X-Y table 45 is moved accordingly.

With the above control, the winding device 35 can accurately laser weld the crest of the flat sheet 2 and corrugated sheet 3. The flat sheet 2 and corrugated sheet 3 are wound, the slit 4 is formed on only one end, and the flat sheet 2 and corrugated sheet 3 are laser welded at the designated positions to obtain the metal catalyst carrier 10.

Next, the functions of the first embodiment will be described. After the engine 5 starts, the exhaust gas emitted from each cylinder's exhausting process flows through the exhaust manifolds 6a and 6b, and collides with the slit matrix positioned at the upstream side of the metal catalyst carrier 10. As a result, the temperature of the slit matrix rises the most rapidly because the heat capacity is small due to the formation of the slits formed on the slit matrix, and because the slit matrix is insulated from the outer casing 8 by the air layer.

The following three points also contribute to the efficient rising of the temperature achieved due to the shape of the slit matrix, which is the low heat capacity area, having multiple openings formed the multiple slits.

First, as the cross-sectional area of the heat transfer portion is small and passage is longer in the axial direction of the metal catalyst carrier 10, the downstream area of the slit matrix being heated can suppress the transfer of heat.

Secondly, in the same manner as the first point, due to the formation of the slit matrix, the contact area of the flat sheet 2 and corrugated sheet 3 in the radial direction of the metal catalyst carrier 10 is reduced, so the transfer of heat toward the outer casing can be reduced.

Thirdly, the slit matrix functions to mix the flow of the exhaust gas and thus the heat transfer efficiency can be increased.

The metal catalyst carrier 10 and outer casing 8 are joined near the downstream side end and is fixed to the exhaust pipe at the upstream portion so the passage of heat radiation transferred from the outer casing to the exhaust pipe is extremely long. In turn, the heat radiation amount is extremely small.

The reactionary heat caused by the oxidation reaction of HC and CO in the exhaust gas is transferred to the downstream side to help the temperature of the downstream side to rise.

Furthermore, the downstream side on which non-slit matrix portion is formed has a heat transfer that is larger in the radial and axial direction compared to the upstream side that has the slit matrix, and thus the heat transfer speed can be increased. In other words, the entire area of the downstream side can quickly raise the catalyst to the active temperature.

Due to the above reasons, within 15 to 16 seconds after engine 2 is started the entire area of the metal catalyst converter 1 can be activated. In the same way, the start catalyst 7 arranged in the direct downstream from the metal catalyst converter 1 is successively activated from the near the upstream side by the high temperature exhaust gas that passes through the metal catalyst converter 1.

In the first embodiment, even if a large volume of exhaust gas flows when the engine 2 is heavily loaded, approximately 80% or more of the HC and CO in the exhaust gas can be purified by the metal catalyst converter 1 and start catalyst 7.

Figure 13:
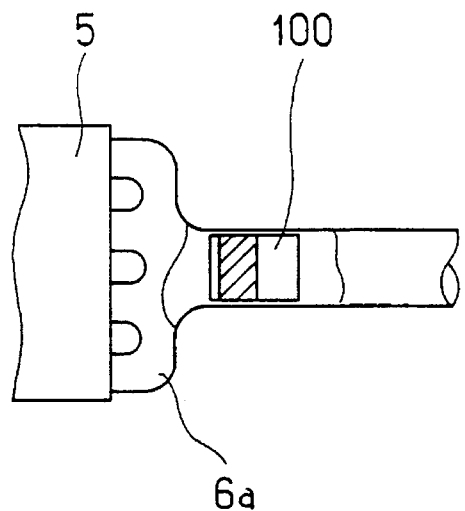
FIG. 13 is an explanatory view illustrating the position of the metal catalyst converter and engine in the comparative experiment.

Next, the characteristics of temperature rise by exhaust gas were compared between the metal catalyst converter according to the present invention and a conventional catalyst converter. In the comparative experiment, the metal catalyst converter according to the present invention and the conventional metal catalyst converter where configured as illustrated in FIG. 13. In other words, for the metal catalyst converter according to the present invention, a slit matrix was formed on only one end of the flat sheet and corrugated sheet as formed in the first embodiment. In the conventional metal catalyst converter (not illustrated) a band-shaped sheet metal with non-slit matrix portion on the metal catalyst converter 100 according to the present invention was employed.

Figure 14A:
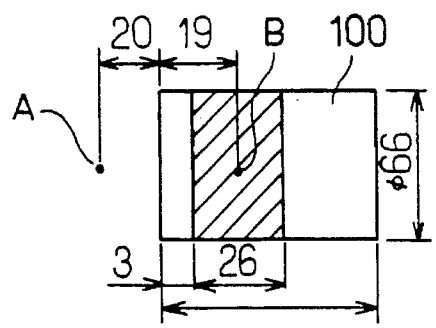
FIG. 14A is a side view of the metal catalyst carrier for the comparative experiment.
Figure 14B:
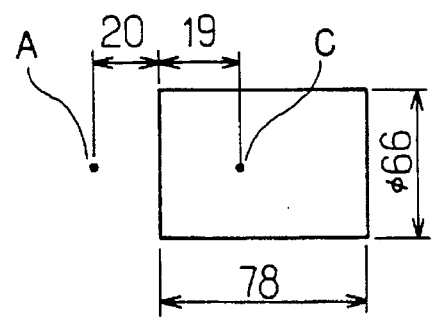
FIG. 14B is a side view of the metal catalyst carrier for comparison purposes in the comparative experiment.

Each metal catalyst converter was as illustrated in FIGS. 14A and 14B. The metal catalyst converter 100 according to the present invention had a column shape with a diameter of 66 mm and axial length of 78 mm as illustrated in FIG. 14A. A slit matrix with a width of 26 mm was formed at a position separated 3 mm downstream from the upstream side of the metal catalyst converter.

The conventional metal catalyst converter had the same shape as the metal catalyst converter 100 according to the present invention but without the slit matrix as illustrated in FIG. 14B.

Figure 15:
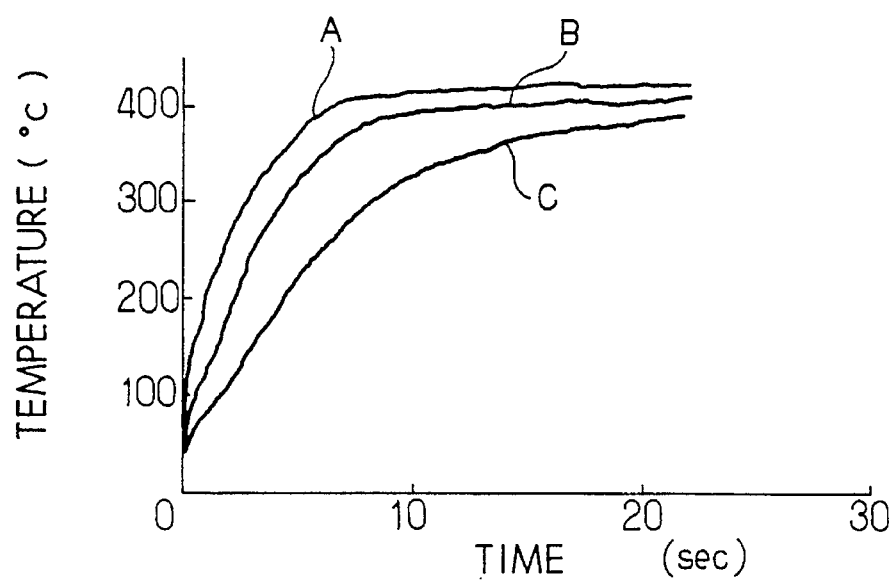
FIG. 15 is a characteristic diagram illustrating the results of the comparative experiment.

These metal catalyst converters were installed at a distance where the exhaust gas emitted from the engine would reach approximately 300° C. within two to three seconds after the engine was started. To find the temperature rise of the metal catalyst converter, a temperature at the center of the metal catalyst converter 19 mm downstream in the axial direction from the upstream of each metal catalyst converter was measured. The results are illustrated in FIG. 15.

Figure 16:
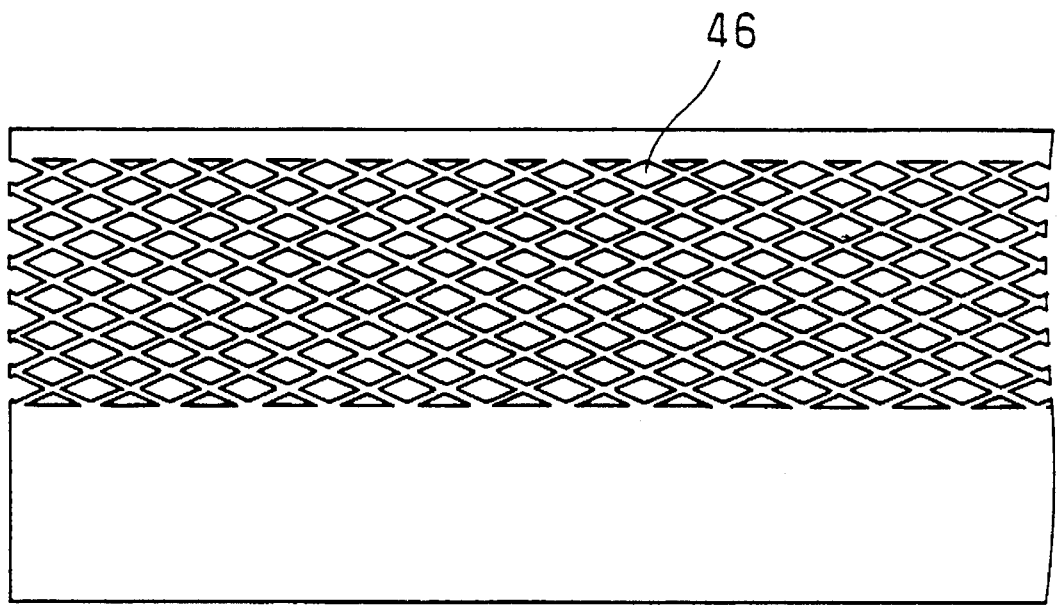
FIG. 16 is a development view illustrating other embodiments of the slits used in the present invention.

In this figure A denotes a temperature of the exhaust gas at 20 mm upstream from the metal catalyst converters, B denotes a temperature inside the metal catalyst converter according to the present invention, and C denotes a temperature within the conventional metal catalyst converter. As can be seen in FIG. 16, the metal catalyst converter according to the present invention reached approximately 300° C. in 4 to 5 seconds after the engine started, while it took the conventional metal carrier 8 to 9 seconds after the engine was started.

It can be confirmed that by forming a slit matrix at the upstream side of the metal catalyst carrier, a rapid temperature rise could be achieved. Although the slits have an approximate rectangular shape in the first embodiment, the present invention is not limited to this shape. Instead, rhombus shaped slits 46 as illustrated in FIG. 16 can be used.

Figure 17:
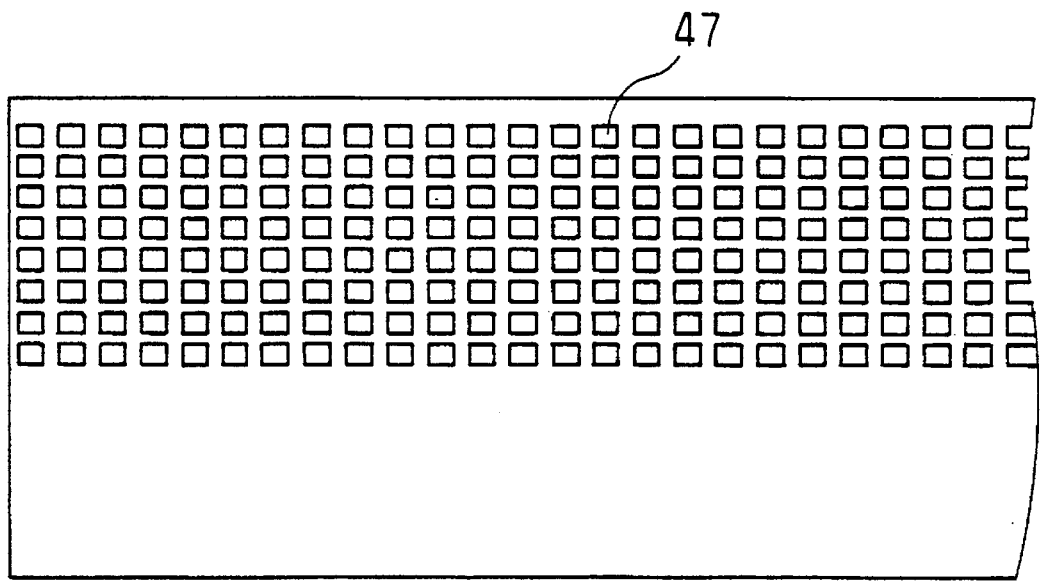
FIG. 17 is a development view illustrating other embodiments of the slits used in the present invention.

Furthermore, the rectangular-shaped slits 47 can be arranged in a state that moves in parallel with the axial direction of the metal catalyst converter can also be used as illustrated in FIG. 17. The slit matrix illustrated in FIG. 17 is achieved by rearranging the slit matrix illustrated in FIG. 4 for the first embodiment with interval H in the axial direction of the metal catalyst converter, and with interval D that crosses with the axial direction of the metal carrier. The particular difference with the slit matrix illustrated in FIG. 4 is that each slit is arranged to have a positional relation that is the same as the axial direction of the metal catalyst converter. This slit matrix is a row used to increase the rigidity of the metal catalyst converter, and although the axial direction heat transfer of the metal catalyst converter will drop somewhat, it is a level that does not pose a problem for the temperature rise performance. By using a slit matrix with a high characteristic frequency, the durability can be improved.

To achieve a sufficient strength (characteristic frequency) in the metal catalyst carrier, the aspect ratio h:W of the above slit should be 1:5 or less. Wherein, h is the length of the slit in the axial direction of the metal catalyst carrier, and W is the length of the slit in the direction perpendicular to the axial direction of the metal catalyst carrier.

The aspect ratio h:W of the slit matrix in the first embodiment is 1:2.5 (h=1.2, W=3), and is within the range of the ratio 1:5. This metal catalyst carrier was manufactured, and the characteristic frequency that is one index for expressing the mechanical strength was measured. A high value of 2 kHz or more was confirmed. After studying the characteristic frequency in various samples, it was found that the rigidity of the metal catalyst carrier became smaller and lower as the aspect ratio of the slit matrix increased. For example, in a metal catalyst carrier of which the slit matrix aspect ratio h:W was 1:6 (h=0.5: W=3), the characteristic frequency was less than 2 kHz.

As explained above, if the slit matrix aspect ratio h:W was 1:6 or more, the characteristic frequency was low, and the possibility that resonance would occur due to engine vibration increased. Thus, sufficient durability and reliability cannot be ensured.

On the other hand, in terms of purification performance, the dimensions of the slit matrix should have an opening percentage of 30 to 50% to ensure a sufficient purification performance immediately after starting. The opening percentage is calculated as follows:

[Opening percentage]=[Total of slit matrix hole portion surface area]÷[Surface area when metal carrier is manufactured with same size and non-slit matrix portion].

In calculating, the thickness and side circumferential length is not considered.

Figure 39:
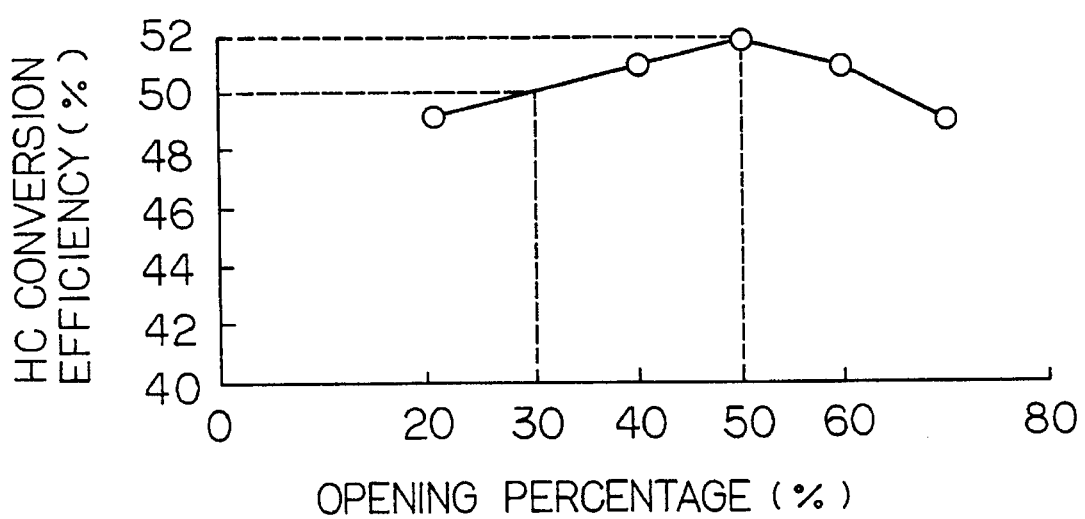
FIG. 39 is a characteristic diagram illustrating the relation between opening percentage and HC conversion efficiency.

The opening percentage of the slit matrix in the first embodiment is 46%, and is within the above 30 to 50% range. If the opening percentage is increased, the surface area of the metal catalyst carrier will drop, and on the other hand, if the opening percentage is too small, the heat capacity of the metal catalyst carrier will increase and the specified purification will not be obtained. As with the aspect ratio of the slit matrix, the slit matrix opening percentage was studied with various samples as shown in FIG. 39. FIG. 39 shows a relationship between HC conversion efficiency and the opening percentage. HC conversion efficiency is required 50% or more. Further to secure enough strength the opening percentage must prevent from rising 50% or less. It is confirmed that the exhaust gas could be sufficiently purified immediately after starting the engine within the range of 30–50% of opening percentage. Consequently, the opening percentage should be set within 30–50%.

With the metal catalyst carrier presented in the first embodiment, a non-slit portion was provided near the foremost from of the slit matrix so that the metal flat sheet and corrugated sheets could be joined. The flat sheet 2 and corrugated sheet 3 in the metal catalyst carrier are joined at this section.

In other words, the foremost front end is formed as the welding margin for obtaining the strength of the metal catalyst carrier. Conventionally, the foremost front end of the metal catalyst carrier was a member that easily received the thermal energy of the exhaust gas, and it was preferred that there be no non-slit matrix portion in terms of performance. The axial length of the non-slit matrix portion was read with a barometer, and the range that did not affect the temperature rise and purification performance after starting was studied. As a result, it was found that if the area was 3 to 5 mm the performance would not be lost.

As explained above, after the temperature of the slit matrix rises, the heat is transferred to the non-slit portion formed at the rear end of the metal catalyst carrier.

As there is non-slit matrix portion formed on either the flat sheet or corrugated sheet at the non-slit area, the heat transfer speed is extremely fast, and the temperature of the portion rose in a short time.

However, if the non-slit matrix portion at the rear end of the metal catalyst carrier is too long, the temperature rise of the slit matrix will be obstructed. Thus, using the length of the non-slit matrix portion as a parameter, the optimum state was studied. As a result, it was found that if it was placed within the range of 5 to 60% from the upstream side of the metal catalyst carrier in the exhaust gas direction, the entire area could be activated in approximately 20 seconds after starting, and a sufficient purification performance could be achieved.

Furthermore, in the first embodiment, the radial direction length of the space formed between the outer casing and metal catalyst carrier was set to be approximately the same length as the crest height of the corrugated sheets that configure the metal catalyst carrier. This is because if the dimensions of the space formed between the outer casing and metal catalyst carrier is too large, the non-reacted gas will blow through the space. Thus, the space must be less than the crest height. In other words, if the space is less than the approximate crest height, a sufficient purification performance can be achieved as the catalyst is held also on the inner surface of the outer casing.

The durability of the metal catalyst converter 1 presented in the first embodiment will be described. The outer casing 8 which sheaths the metal catalyst carrier 10 is installed by fixedly welding at 11 to the metal catalyst carrier 10 on the downstream side of the slit matrix arranged on the flat sheet 2 and corrugated sheet 3. Furthermore, the joining portion of the flat sheet 2 and corrugated sheet 3 is set to sandwich the slit matrix, but to not contact the outer casing 8 at the upstream and downstream sides.

Normally the thermal stress generated at the metal catalyst carrier 10 due to the cooling and heating cycle of the exhaust gas heat is caused by the difference in thermal expansion of the metal catalyst carrier 10 and outer casing 8. In other words, it is generated by the large heat gradient near the outer most circumference of the metal catalyst carrier 10 due to the difference in linear expansion coefficient and difference in thermal capacity of the outer casing 8 and metal catalyst carrier 10. However, with the configuration of the first embodiment, the heat gradient is small because of the opening portion or the space 8a formed between the metal catalyst carrier 10 and outer casing 8 at the welding portion, so the thermal stress that occurs at the welding point can be suppressed.

To achieve this, the axial direction length of the space layer between the outer casing 8 and metal catalyst carrier 10 formed at the downstream side of the slit as the welding margin must be approximately 2 mm or more.

As the metal catalyst carrier 10 is connected to the outer casing 8 at only one end, the thermal stress that occurs due to the thermal expansion and contraction in the axial direction of the metal catalyst carrier 10 is small.

As multiple opening portions 8a are arranged with an interval in the circumferential direction of part or all of the portion of the outer casing that contacts with the metal catalyst carrier 10, the outer casing 8 thermally deforms according to the radial direction thermal expansion/contraction of the metal catalyst carrier 10, so the reaction to this radial direction thermal expansion/contraction can be suppressed. With the above configuration and functions, the metal catalyst converter 1 according to the present invention has a durability that can withstand high temperatures exceeding 900° C. and the cooling and heating cycle with the outdoor air.

As a confirmation test, the metal catalyst converter according to the present invention was installed directly below the engine manifold. An engine cooling/heating cycle durability test wherein the temperature was changed between 100° C. and 900° C. in approximately 20 minute intervals was executed. It was confirmed that the converter did not break even after 1000 cycles, and thus the durability was confirmed. The flat sheet 2 and corrugated sheet 3 are alternately wound to obtain the metal catalyst carrier 10 in the first embodiment, but the present invention is not limited to this method. The metal catalyst converter can also be obtained by alternately laminating the flat sheet 2 and corrugated sheet 3.

(Second Embodiment)

Figure 18:
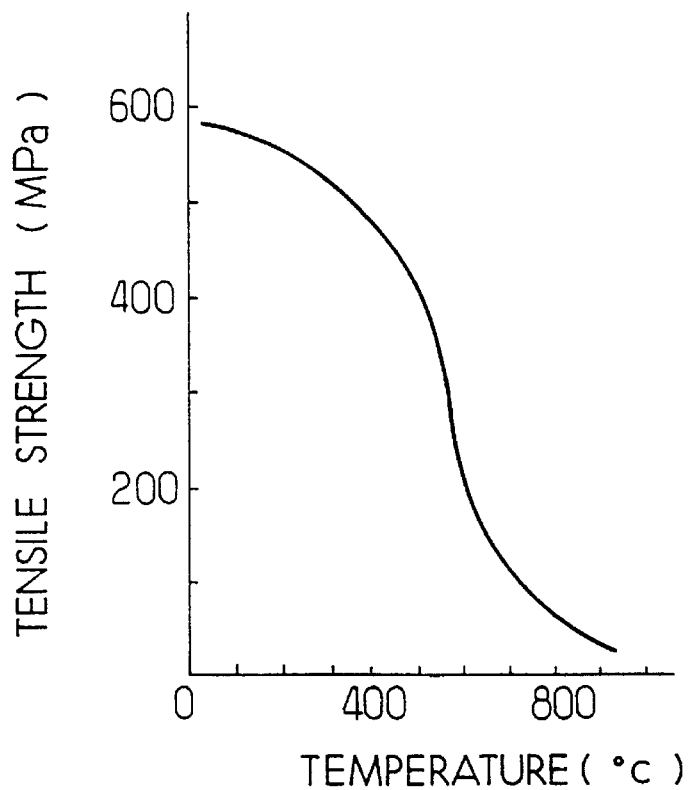
FIG. 18 is a characteristic diagram illustrating the relation between the material temperature and tensile strength.

The temperature rise characteristics can be improved by forming the slits 4 on both the flat sheet 2 and corrugated sheet 3 as in the first embodiment. The problem with this though, is that if the structure is used in an exhaust gas environment that exceeds 950° C., the strength at the sections where the slits 4 are formed in the flat sheet 2 and corrugated sheet 3 will be required more. Furthermore, as the tolerable strain of the material used to form flat sheet 2 and corrugated sheet 3 drops at high temperatures as illustrated in FIG. 18, the shape of the slits tend to be restricted for durability and strength.

Thus, in the second embodiment, by providing slits on only the front end of the flat sheet 2 or the corrugated sheet 3 which faces the exhaust gas inflow direction, and non-slit matrix portion on the other the required strength can be achieved.

Figure 19:
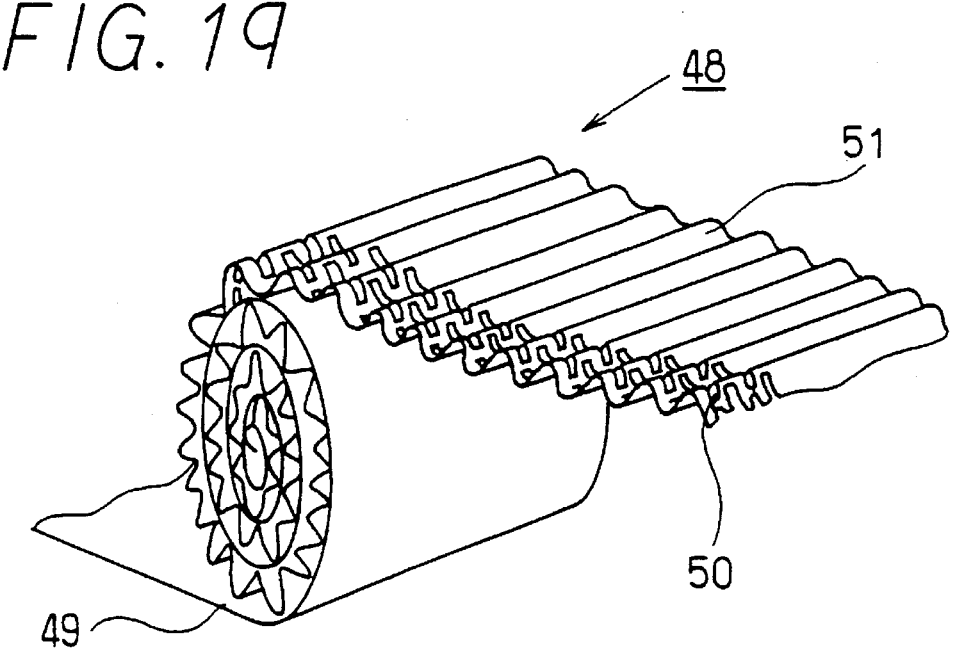
FIG. 19 is a development view illustrating the metal catalyst carrier according to the second embodiment.

FIG. 19 is a development view of the metal catalyst carrier 48 according to the second embodiment.

The metal catalyst carrier 48 that holds the catalyst that generates an oxidation reduction reaction with the toxic elements of the exhaust gas in the honeycomb, is formed by alternately winding the flat sheet 49 that has non-slit matrix portion and the corrugated sheet 51 that has slits 50.

With this type of structure, the metal catalyst carrier 48 having an outstanding durability can be achieved.

Figure 20:
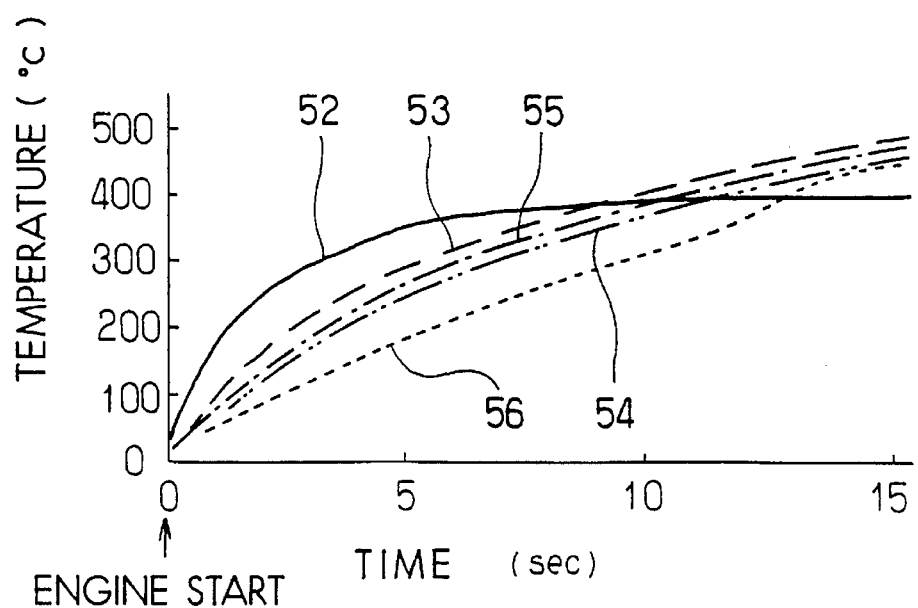
FIG. 20 is a characteristic diagram illustrating the relation between the time and temperature in the second embodiment and comparison embodiment.

FIG. 20 is a characteristic view illustrating the specific comparison in specific temperature rise performance. In this figure, line 52 denotes the temperature of the gas that flows into the metal catalyst converter, line 53 denotes the metal catalyst carrier of the first embodiment with slit portion formed on both the flat sheet and corrugated sheet, line 54 denotes the metal catalyst carrier of the second embodiment with slit portion formed on only the flat sheet, line 55 denotes the metal catalyst carrier of the second embodiment with slit portion formed on only the corrugated sheet, and line 56 denotes the conventional metal catalyst carrier having non-slit matrix portion.

As is evident from FIG. 20, the metal catalyst carrier with a slit portion formed in either the flat sheet or the corrugated sheet can achieve sufficient temperature rise characteristics compared with the conventional metal catalyst carrier. In the second embodiment, as the slit portion is formed only on the corrugated sheet side, the surface area per unit volume of slit portion can be increased thereby improving the holding density.

In the second embodiment, the slit portion was formed on the corrugated sheet and not on the flat sheet, but this is not limited. The slit portion can be formed on the flat sheet instead of the corrugated sheet. Furthermore, in the first embodiment the metal catalyst carrier was created by alternately winding the flat sheet and corrugated sheet, but the structure can also be created by alternately laminating the flat sheet and corrugated sheet.

(Third Embodiment)

Figure 21:
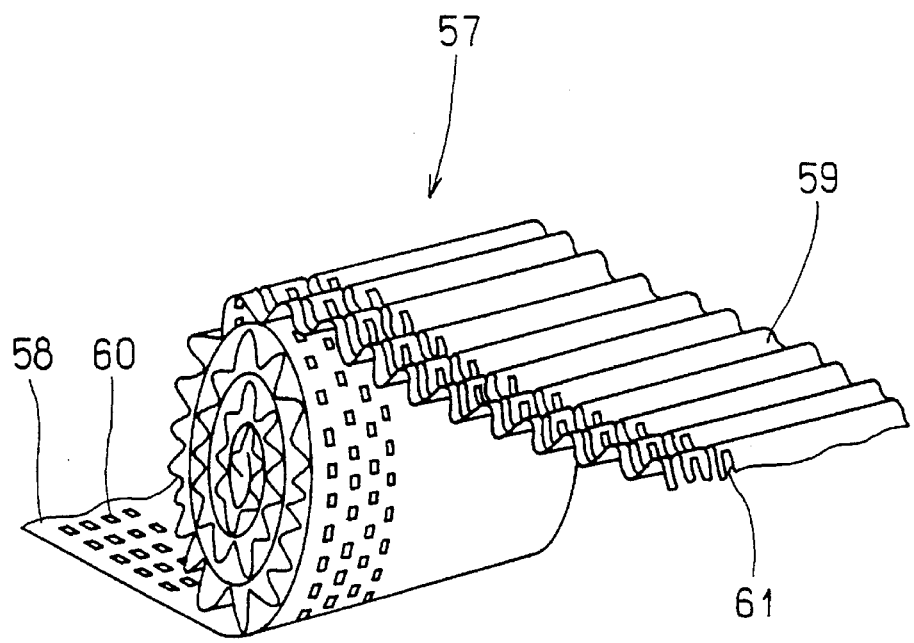
FIG. 21 is a simulation view illustrating the metal catalyst carrier according to the third embodiment during rotation.

The third embodiment according to the present invention will be described. FIG. 21 illustrates a simulation of the metal catalyst carrier 57 during winding.

The metal catalyst carrier 57 that holds the catalyst that creates an oxidation reduction reaction with the toxic elements of the exhaust gas in the honeycomb body and purifies the gas is configured by alternately winding the flat sheet 58 and corrugated sheet 59.

Figure 22:
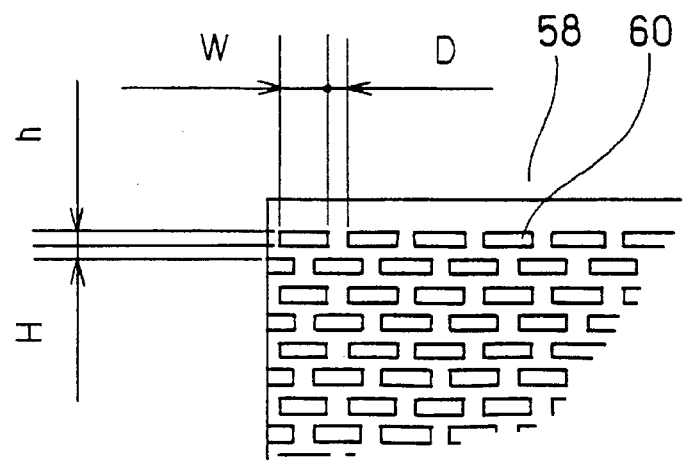
FIG. 22 is a partial enlargement view of the slits used for the third embodiment.

The flat sheet 58 and corrugated sheet 59 have a width of 60 mm and thickness of 0.05 mm. Slit matrix 60 and slit matrix 61 are formed along 30.95 mm on one end of both sheets with differing slit aspect ratios. FIG. 22 is a partial enlargement view illustrating the shape of the slit matrix 60 and slit matrix 61 incorporated in the third embodiment.

The slits formed on flat sheet 58 have a width w of 3 mm, height h of 1.2 mm, and each slit is arranged with an interval H of 0.8 mm in the axial direction of the metal catalyst carrier, and an interval D of 1 mm in the direction that crosses with the axial direction of the metal catalyst carrier. The adjacent slits are offset each other by a distance of (W+D)/2 in the axial direction of the metal catalyst carrier.

In the same manner, the slit matrix 61 on the corrugated sheet 69 has a width w of 6 mm and height h of 1.2 mm. Each slit is arranged with an interval H of 0.5 mm in the axial direction of the metal catalyst carrier, and interval D of 1 mm in the direction that crosses with the axial direction of the metal catalyst carrier. Bumps are continuously formed with a pitch of 4.7 mm and height of 1.75 mm.

By alternately layering and winding this flat sheet 58 and corrugated sheet 59, the metal catalyst carrier 57 according to the third embodiment in which the flat sheet 58 and corrugated sheet 59 having differing slit aspect ratios is achieved.

As explained above, the metal catalyst carrier 57 according to the third embodiment in which the flat sheet 58 with a small slit aspect ratio (h:w=1:2.5) and the corrugated sheet 49 with a large slit aspect ratio (h:w=1:5) are combined can be achieved.

Next, the operation, when the same type of outer casing as that in the first embodiment is welded to this metal catalyst carrier 57 to form the metal catalyst converter, and then arranging this in the exhaust manifolds 6a and 6b that are the exhaust gas passage illustrated in FIG. 6 for the first embodiment, will be explained.

After the engine 2 starts, the exhaust gas emitted from each cylinder's exhausting process flows through the exhaust manifolds 6a and 6b, and collides with the slit matrix 60 and 61 positioned at the upstream side of the metal catalyst carrier 57.

As a result, the temperature of the slit matrix 61 on the corrugated sheet 59 rises the most rapidly because the heat transfer passage is long and the heat transfer is smaller than the slit matrix 60 of the flat sheet 58. The heat transfer of the slit matrix 60 on the flat sheet 58 in the third embodiment is approximately $\frac{1}{25}$ of when there are no slits, and the heat transfer of the slit matrix 61 on the corrugated sheet 59 is approximately $\frac{1}{10}$ of when there are no slits.

When the temperature of the slit matrix 60 and 61 reach the active temperature of the catalyst held by the metal catalyst carrier 57, the purification of the exhaust gas starts. The activation of the catalyst at the downstream side of the flat sheet 58 and metal catalyst carrier 57 starts due to the reactionary heat and the heat transferred in the metal catalyst carrier 57. The catalyst can be activated within the entire area of the metal catalyst carrier 57 within 15 to 16 seconds after engine 2 is started.

On the other hand, the pulsation of the exhaust gas colliding with the slit matrix 60 and 61 and the vibration of the engine 2 applies a considerable stimulus force (approximately 20 G) to the metal catalyst carrier 57. By suppressing the slit aspect ratio (h:W) of the flat sheet 58 wound in the metal catalyst carrier, the resonance frequency of the metal catalyst carrier 57 can be increased to approximately four times of the stimulus frequency (approximately 500 Hz) which is the maximum primary explosion element of the engine 2. As a result, the metal catalyst carrier 57 has an extremely durable structure.

In the third embodiment, the slit vertical horizontal ratio of the flat sheet 58 was set to be smaller than that of the corrugated sheet 59, but this can be reversed. Furthermore in the third embodiment, rectangular slits were used, but this shape is not limited, and the rhombus shape illustrated in FIG. 16 for the first embodiment or the wavy shape illustrated in FIG. 17 can be used.

As explained according to this invention by using differing slit shapes on the corrugated sheet and flat sheet, and by using differing aspect ratios for the slit portions, the characteristics of the temperature rise characteristics and the vibration resistance characteristics can be changed. In the third embodiment, the flat sheet 58 and corrugated sheet 59 were laminated and wound to create the metal catalyst carrier 57. However, the metal catalyst carrier 57 can also be created by simply laminating the flat sheet and corrugated sheet.

(Fourth Embodiment)

The fourth embodiment relates to the method of manufacturing the honeycomb body that is the metal catalyst holder by holding the catalyst. In the first and second embodiments, the axial length of the corrugated sheet and flat sheet that configure the honeycomb body were equal. When manufacturing this honeycomb body, the flat sheet and corrugated sheet must be alternately laminated and wound and the peak of the corrugated sheet welded to the flat sheet as illustrated in FIGS. 9 to 12 for the first embodiment.

Figure 23:
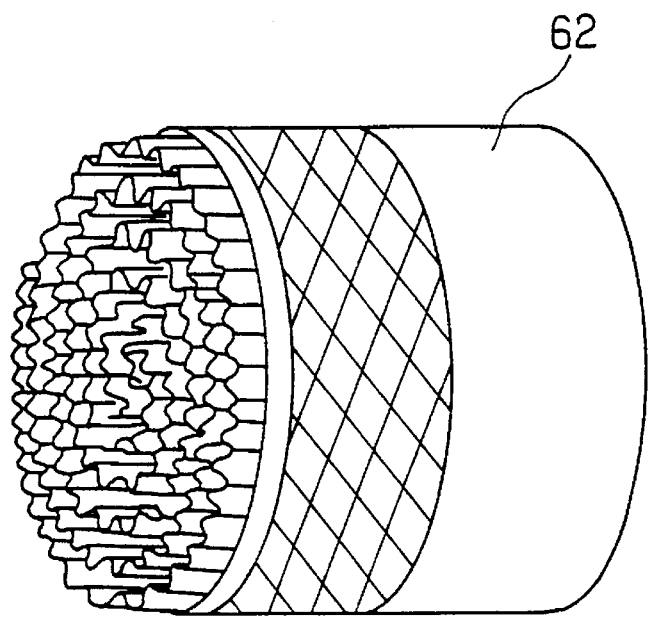
FIG. 23 is a simulation view illustrating the metal catalyst carrier according to the fourth embodiment.
Figure 24:
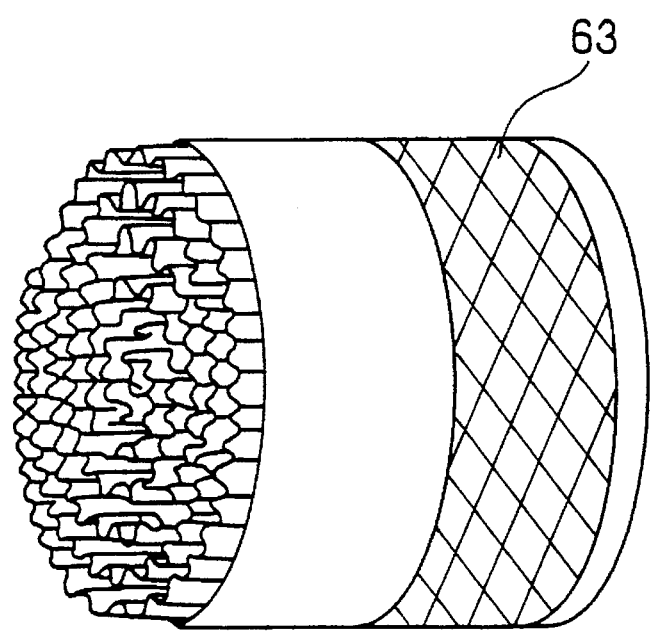
FIG. 24 is a simulation view illustrating the metal catalyst carrier according to the fourth embodiment.

When performing laser welding for this, the welding position must be accurately detected, and the laser beam must be radiated at the peak of the corrugated sheet to be welded. However, if the flat sheet is wound on the outer circumference of the corrugated sheet and welding is done, the peak must be detected through the flat sheet, and thus, detection wit the laser displacement sensor is difficult. With the overcurrent-type displacement sensor, the waves of the corrugated sheet must be detected through the flat sheet. However, as the output signal gain is small precise detection is difficult. In the fourth embodiment an example in which the welding position is easily detected by using a honeycomb body in which at least one end of the corrugated sheet in the honeycomb carrier is protruding from the flat sheet is presented. FIG. 23 illustrates an example in which the corrugated sheet is protruding from the flat sheet at the upstream side end. FIG. 24 illustrates when the corrugated sheet protrudes from the flat sheet at the downstream side end.

According to the honeycomb body 62 or 63 present in the fourth embodiment, the peak of the corrugated sheet, which is the welding position, always appears at the surface during laser welding. As the peak of the corrugated sheet that is to be welded only needs to be detected, the detection method is easy and the precision is improved.

Furthermore, the corrugated sheet always appears at the surface in the fourth embodiment, so detection is easy even with a contact-type displacement sensor other than the non-contact type displacement sensor. For example, a gear having a direct corrugated sheet shape can be installed on a rotary shaft such as an encoder and rotated with the corrugated sheet. Then, the welding position can be detected with the output signal.

(Fifth Embodiment)

Figure 25:
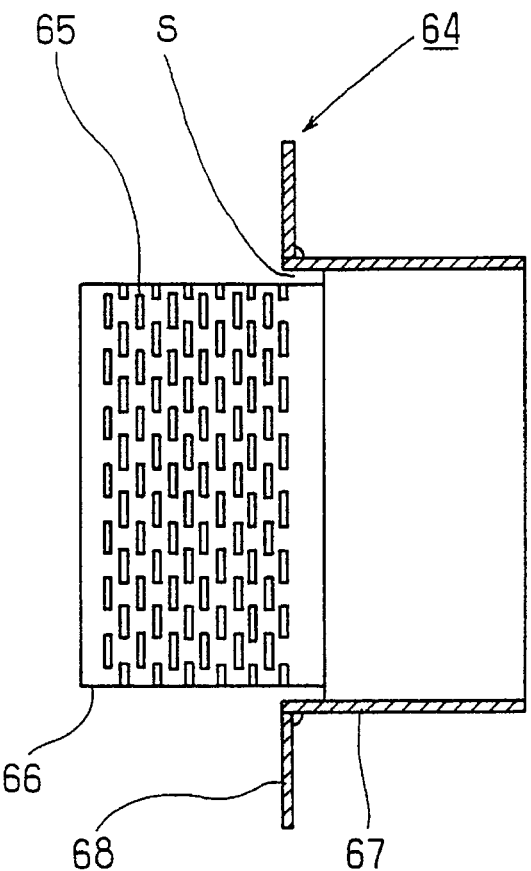
FIG. 25 is a simulation view illustrating the metal catalyst converter according to the fifth embodiment.

The metal catalyst carrier 64 that holds the catalyst in the honeycomb body according to the fifth embodiment is illustrated in FIG. 25.

As with the first embodiment, the metal catalyst converter 64 has an outer casing installed to a metal catalyst carrier 66 formed by winding a corrugated sheet and flat sheet (not illustrated) on which slit matrix 65 is formed only on the upstream side of the exhaust gas passage.

However, the difference with the metal catalyst converter 1 according to the first embodiment, is that the number of corrugated sheet and flat sheet windings on the downstream side of the exhaust gas passage excluding the slot row on the metal catalyst carrier exceeds the number of flat sheet and corrugated sheet windings on the slit matrix 65 portion. Because of this, the diameter of the metal catalyst carrier 66 is larger on the area where the slit matrix is not formed on the downstream side of the exhaust gas passage than on the area where the slit matrix is formed on the upstream side.

By configuring this type of metal catalyst carrier 66, an outer casing 67 in which a clearance S is formed in the small range between the metal catalyst carrier 66 and the casing 67 slit matrix 65 can be achieved without the swaging processing used to deform the diameter of the outer casing 8 in the first embodiment.

As with the first embodiment, in this metal catalyst carrier 64, the outer casing 67 is joined to the section where the slit matrix 65 that is the downstream side of the exhaust gas passage of the honeycomb carriers not formed. Flange 68 is provided at the upstream side end of the exhaust gas passage of the outer casing 67.

FIG. 26 illustrates the configuration when the metal catalyst converter 64 of the fifth embodiment is arranged in the exhaust gas passage. As illustrated in FIG. 26, the flange 68 provided on the outer casing is coupled and fixed via the gasket 15 between the exhaust manifold installation flange 14a and the start catalyst installation flange 14b.

The metal catalyst converter 64 is held and fixed so that a dimensional relation that creates the space portion S between the metal catalyst carrier 64 and exhaust manifold 6a is established. As in the first embodiment, with this configuration, the space portion S can be formed without using the large outer casing 67 that opposes slit matrix 65. Thus, the same effect as the first embodiment can be achieved inexpensively.

(Sixth Embodiment)

Figure 27:
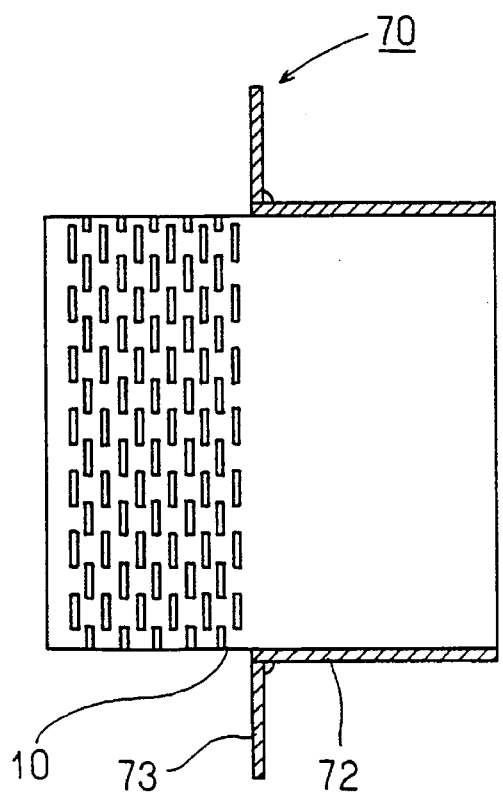
FIG. 27 is a simulation view illustrating the metal catalyst converter according to the sixth embodiment.

FIG. 27 illustrates the metal catalyst converter 70 according to the sixth embodiment. This metal catalyst converter 70 is configured of the metal catalyst carrier 10, which holds the catalyst in the honeycomb body, and the outer casing 72.

As with the first embodiment, this metal catalyst carrier 10 is configured by winding corrugated sheets and flat sheets (not illustrated) on which slit matrix is formed only on the upstream side of the exhaust gas passage.

The metal catalyst carrier 10 is then joined with the outer casing 72 at the position where the slit matrix is not formed on the downstream side of the exhaust gas passage.

The difference between the sixth embodiment and fifth embodiment is that on the six embodiment a space portion is not formed between the outer casing 72 and metal catalyst holder 10.

Figure 28:
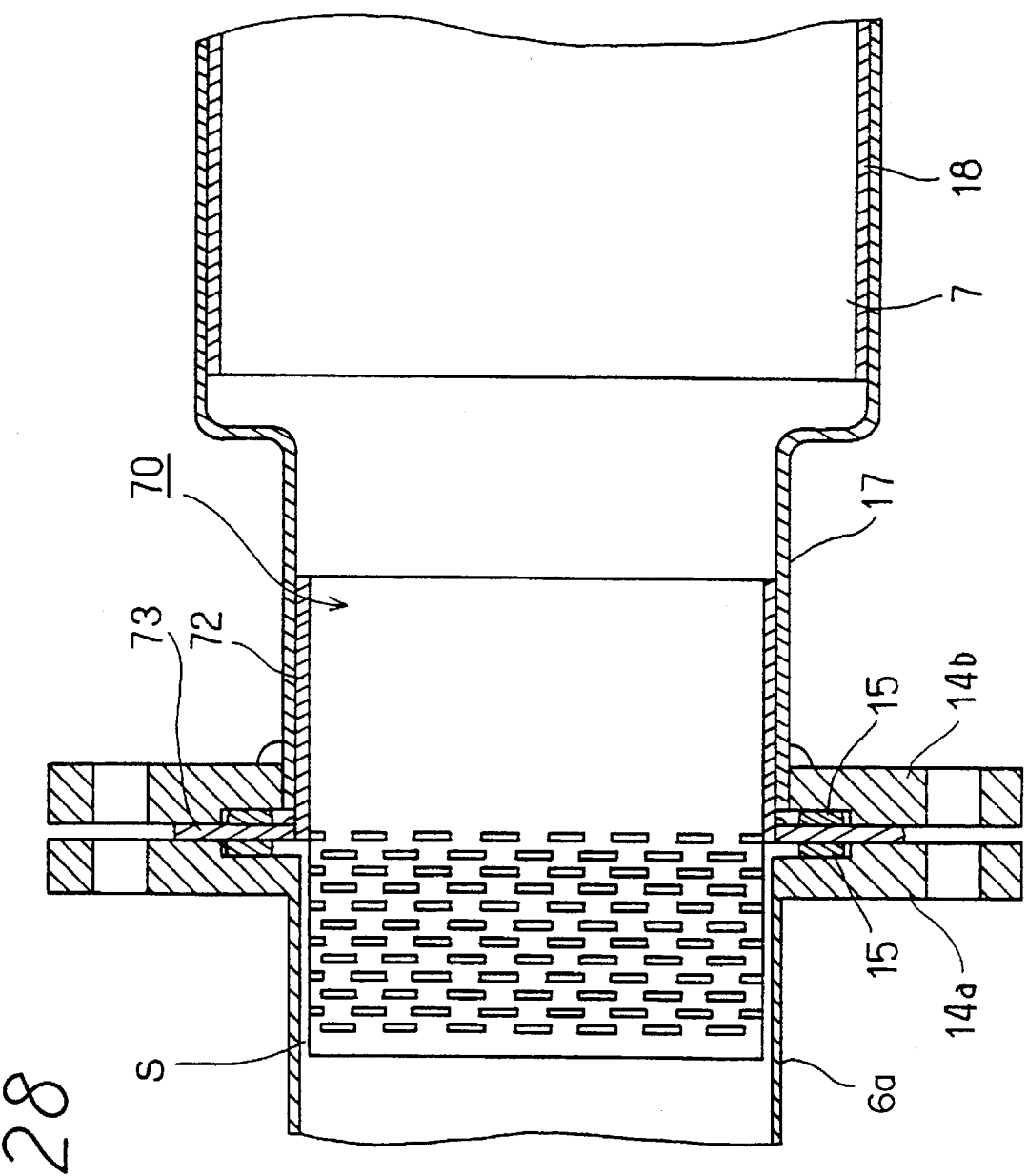
FIG. 28 is a partial cross-sectional view illustrating the structure for holding the metal catalyst converter according to the sixth embodiment.

FIG. 28 illustrates the configuration when the metal catalyst converter 70 according to the sixth embodiment is arranged in the exhaust gas passage.

Even in the sixth embodiment, the flange 73 prepared on the outer casing 72 is coupled and fixed via gasket 15 between exhaust manifold installation flange 14a and the start catalyst installation flange 14b.

As with the fifth embodiment, the metal catalyst converter 70 is held and fixed so that a dimensional relation that creates the space portion S between the metal catalyst converter 70 and exhaust manifold 6a is established. Thus, the converter can be manufactured inexpensively in the same manner as the fifth embodiment.

(Seventh Embodiment)

Figure 29:
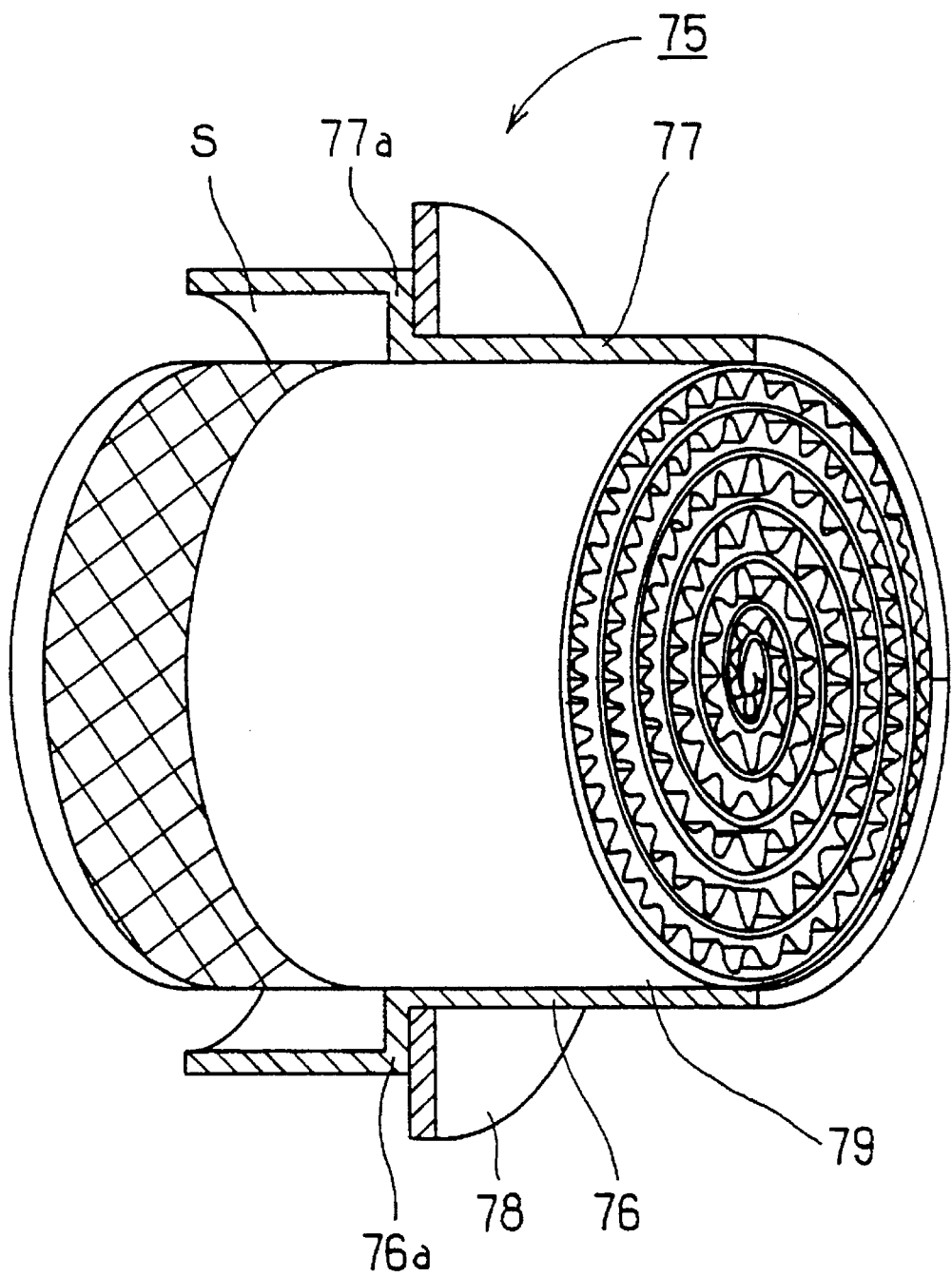
FIG. 29 is a simulation view illustrating the metal catalyst converter according to the seventh embodiment.

FIG. 29 illustrates a simulation of the metal catalyst converter 75 according to the seventh embodiment. The outer casing that configures this metal catalyst converter 75 is configured of the first outer casing 76 and second outer casing 77 that have a divided semi-cylindrical shape structure, and of the fixing ring 78 that fixes these two casings. Stepped portions 76*a* and 77*a* are formed on the outer casings 76 and 77. By forming these stepped portions 76*a* and 77*a*, the metal catalyst carrier 79 that holds the catalyst and outer casings 76 and 77 contact only on the downstream outer circumference of the metal catalyst carrier 79. Thus, a space portion S is formed between the upstream outer circumference side of the metal catalyst carrier 79 and the outer casings 76 and 77.

The outer casing 76 and 77 are joined to the metal catalyst carrier 79 with laser welding or brazing methods. By fitting a fixing ring 78 from the outer side of the split outer casings 76 and 77 so it contacts with the stepped portions 76*a* and 77*a*, the split outer casings 76 and 77 are fixed.

The diameter of the fixing ring 78 in the seventh embodiment is set to be the same or slightly smaller than the outer diameters 76 and 77 achieved when the outer casings 76 and 77 are fit together. Thus, the outer casings 76 and 77 are securely fixed by the fixing ring 78.

Furthermore, the outer casings 76 and 77 are more rigidly fixed with the fixing ring 78 by welding the sides of the outer casings 76 and 77 and the inner circumference of the fixing ring 78.

With the above configuration, the metal catalyst carrier 79, outer casings 76 and 77 and the fixing ring 78 are coupled, and the metal catalyst converter 75 is created. The outer casings 76 and 77 and the fixing ring 78 can also be welded with arc welding or laser welding.

The clearance between the split outer casings 76 and 77 is plugged with the welding, etc. In this manner, the honeycomb carrier 79 is placed between the outer casings 76 and 77, and then the fixing ring 78 is fit in from the outer circumference of the outer casings 76 and 77 so the positioning of the metal catalyst carrier 79 and outer casings 76 and 77, and the fixing of the outer casings 76 and 77 can be done simultaneously. This allows the metal catalyst converter 75 to be achieved easily.

Furthermore, by splitting the outer casings 76 and 77, when the metal catalyst carrier 79 is stored in the outer casings 76 and 77, it does not need to be pressed in as when a whole outer casing is used. Thus, storage is possible without applying excessive compression stress, and the durability of the metal catalyst carrier 79 can be improved. The fixing ring 78 provided on the metal catalyst converter 79 can also be used as a flange.

Figure 30:
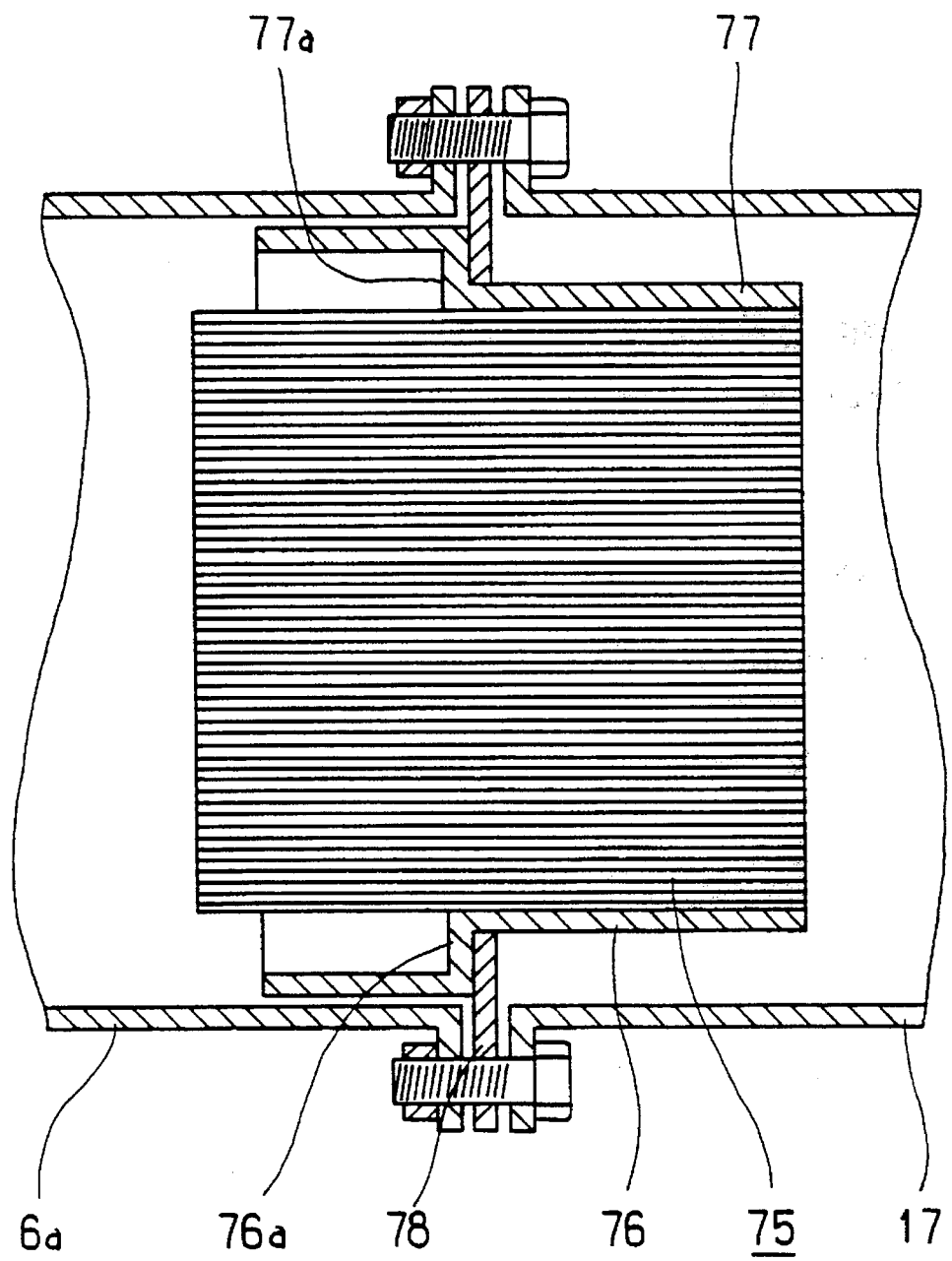
FIG. 30 is a partial cross-sectional view illustrating the structure for holding the metal catalyst converter according to the seventh embodiment.

Therefore as illustrated in FIG. 30, the fixing ring 78 can be fit between the exhaust manifold 6*a* and the outer casing 17 for the start catalyst (not illustrated). With this type of configuration, the metal catalyst converter 75 can be installed in the exhaust manifold 6*a* without changing the configuration of the outer casings 76 and 77 and the start catalyst.

(Eighth Embodiment)

In the seventh embodiment, the outer casing that configures the metal catalyst converter 75 was split horizontally in the middle to create the outer casings 76 and 77, and the clearance between the split outer casings 76 and 77 was plugged with welding, etc. However, in the eighth embodiment, the clearance is left slightly.

Figure 31:
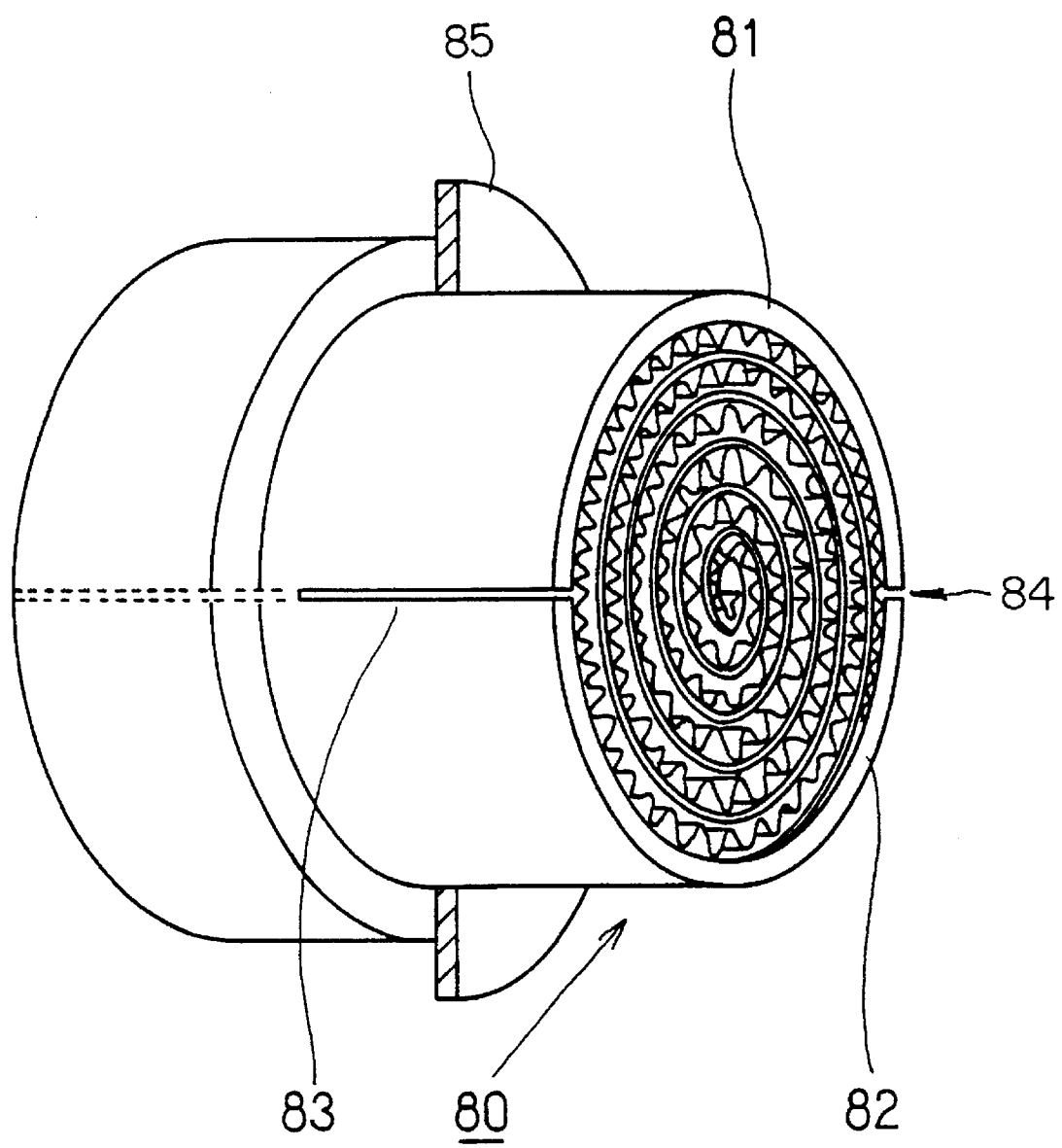
FIG. 31 is a simulation view illustrating the metal catalyst converter according to the eighth embodiment.

FIG. 31 illustrates the metal catalyst converter 80 according to the eighth embodiment. The opening portion 84 is formed on the joining surface of the first and second outer casings 82 and 83 which hold and fix the metal catalyst carrier 81 of the metal catalyst converter 80. This opening portion 84 should be approximately 0.5 mm to 4 mm so that the gas that passes through the opening portion 84 does not blow out when the gas such as the exhaust gas passes through the metal catalyst carrier 81. The outer casings 82 and 83 are then fixed by the fixing ring 85.

According to the eighth embodiment, when the high temperature gas such as the exhaust gas flows into the metal catalyst carrier 81, a reactionary heat occurs due to the held catalyst. Even if the metal catalyst converter 80 itself thermally expands at this time, the opening 84 formed between the outer casings 82 and 83 are pressed open, and the thermal strain that occurs between the metal catalyst converter 80 and outer casings 82 and 83 is reduced.

In other words, the opening portion 84 in the eighth embodiment has the same function and effect as the opening portions 8*a* formed on the outer casing 1 of the metal catalyst carrier 1 in the first embodiment.

Furthermore, the clearance and deformation that occur due to welding strain when welding and fixing the metal catalyst carrier 81 and outer casings 82 and 83 can be prevented, by that eliminating problems such as welding defects.

In the seventh and eighth embodiments, a configuration in which the structure was fixed to the exhaust pipe with a fixing ring was used, but the structure can be welded and joined directly to the exhaust pipe, or a flange-shaped fixing ring can be formed on both ends.

Furthermore, in said embodiments, the metal catalyst carrier was created by alternately winding flat sheets and corrugated sheets. However, the flat sheets and corrugated sheets can be simply layered to create a laminated metal catalyst carrier.

(Ninth Embodiment)

In the first embodiment, it was proposed that an outer casing 8 joined and fixed only at the outer most circumference of the downstream side be provided in the axial direction of the metal catalyst carrier 10 which holds the catalyst in the honeycomb body having slits on the upstream side in the axial direction.

The metal catalyst carrier 10 and outer casing 8 are fixed by welding at multiple points.

However, with this type of configuration, it is difficult to simultaneously weld multiple points, and thus, the points must be welded one at a time or several points at a time.

Figure 32A:
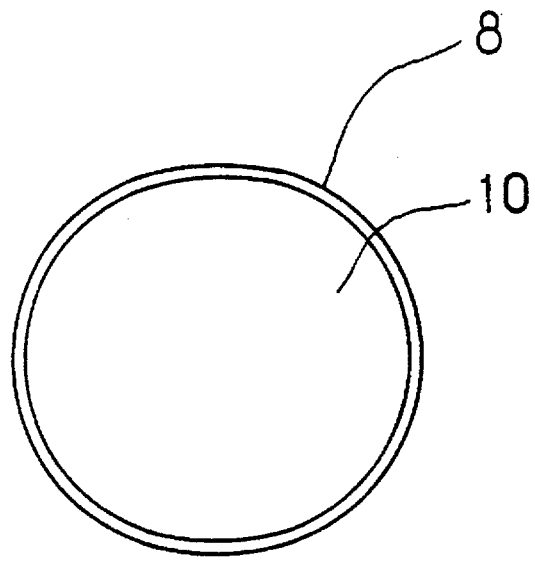
FIG. 32A and FIG. 32B are explanatory views illustrating the problems in the eighth embodiment.
Figure 32B:
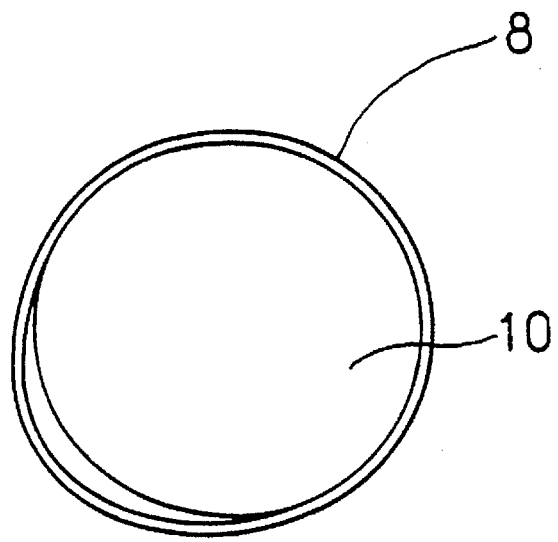

FIGS. 32A and 32B illustrate the problems that occur when welding the metal catalyst carrier 10 and outer casing 8 when there are no opening portions 8*a* formed on the outer casing presented in the first embodiment.

FIG. 32A is a schematic side view illustrating the metal catalyst converter in which the metal catalyst carrier 10 and outer casing have been press-fit but not yet welded.

FIG. 32B illustrates the schematic rear view when one point each on the outer casing 8 and metal catalyst carrier 10 have been welded.

As illustrated in FIG. 32A, before welding, the fit of the metal catalyst carrier 10 and outer casing 10 is favorable without a clearance. However, when the welding is done one point at a time, as the outer casing 8 and metal catalyst carrier 10 materials are each heated to near the melting point, thermal deformation and thermal strain occur in the outer casing 8. Because of this, problems such as the occurrence of clearances, welding defects and insufficient welding strength occur at the welding point of the outer casing 8 and metal catalyst carrier 10 as illustrated in FIG. 32B.

In the ninth embodiment, an opening 8*a* on the rear downstream side of the metal catalyst carrier 10 and outer casing 8 is proposed. By providing this opening portion 8*a*, the thermal deformation that occurs the welding portion, which is one of said problems, can be reduced, and a structure that can absorb the thermal expansion and contraction in the radial direction during the cooling and heating cycle of the metal catalyst carrier 10 can be achieved. The actual shape of this opening portion 8*a* will be described in the ninth embodiment.

Figure 33:
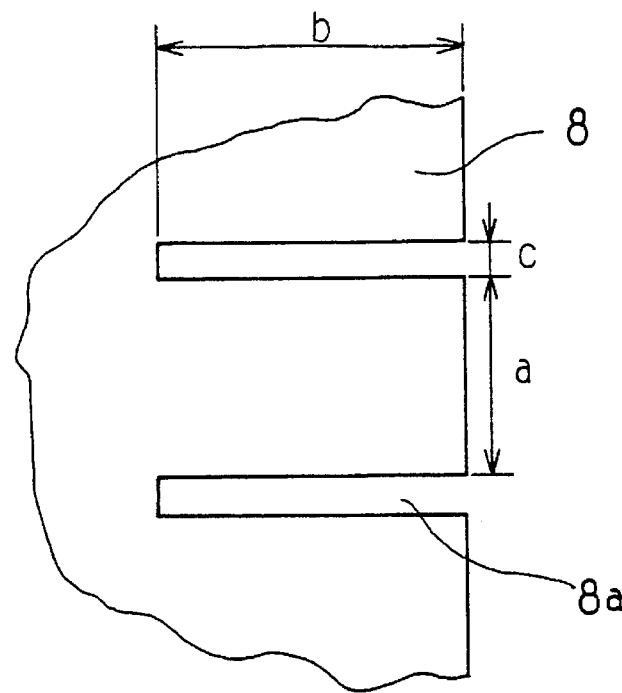
FIG. 33 is a development view of the slits used in the ninth embodiment.

FIG. 33 illustrates the shape of the opening portion 8*a* in the ninth embodiment. In the ninth embodiment such as illustrated in FIG. 33, when the relation of the distance a between the opening portions 8*a* and the axial length b of the metal catalyst carrier of the opening potion 8*a* is a≧b, the thermal deformation during welding of the metal catalyst carrier and outer casing and the thermal expansion and contraction in the radial direction during the cooling and heating cycle of the metal catalyst carrier can be easily absorbed.

This a×b portion functions as a beam configuration during the thermal load and obstructs the thermal expansion in the radius direction of the honeycomb body. Thus, the lower the a×b portion rigidity is, the more easily the deformation can be absorbed.

In other words, the outer casing's a×b portion that occurs with the thermal expansion in the radius direction of the honeycomb has a relation of b≧a, the rigidity can be lowered. Furthermore, if the metal catalyst carrier 10 is press-fit and assembled into the outer casing 8, a pressing force will occur on the metal catalyst body 10 due to the slackening of the outer casing 8, and a favorable joint can be established between the metal catalyst carrier 10 and outer casing 8.

Figure 34:
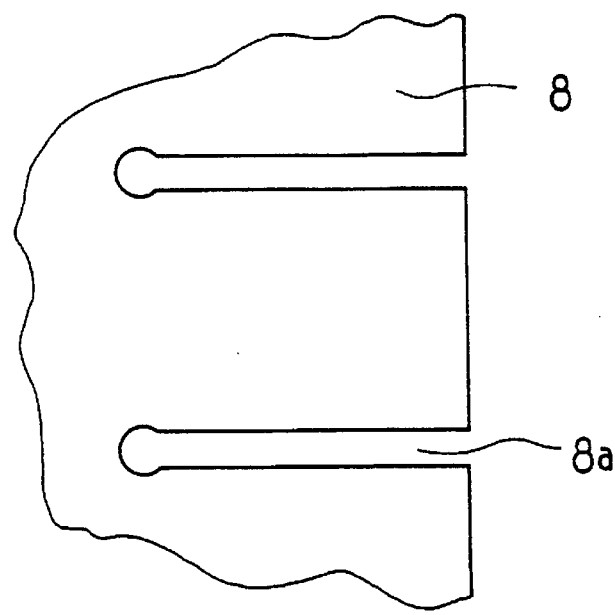
FIG. 34 is a development view of the slits used in the ninth embodiment.
Figure 35:
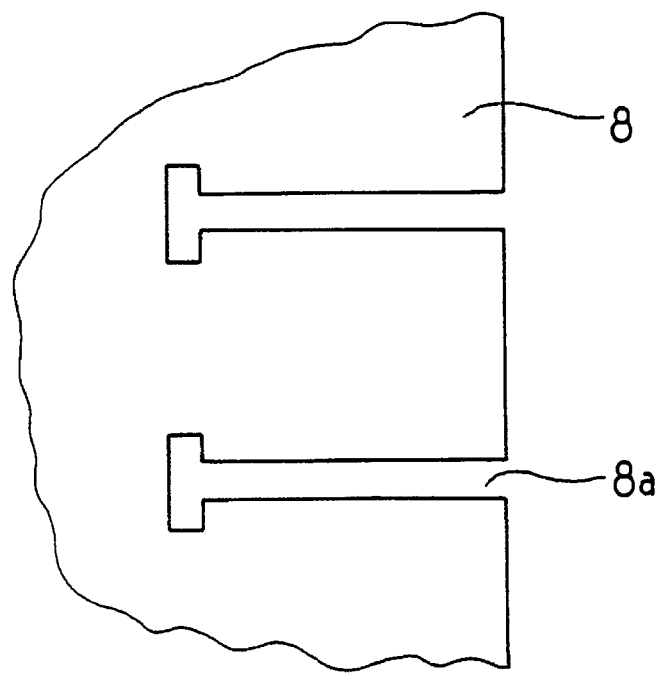
FIG. 35 is a development view of the slits used in the ninth embodiment.
Figure 36:
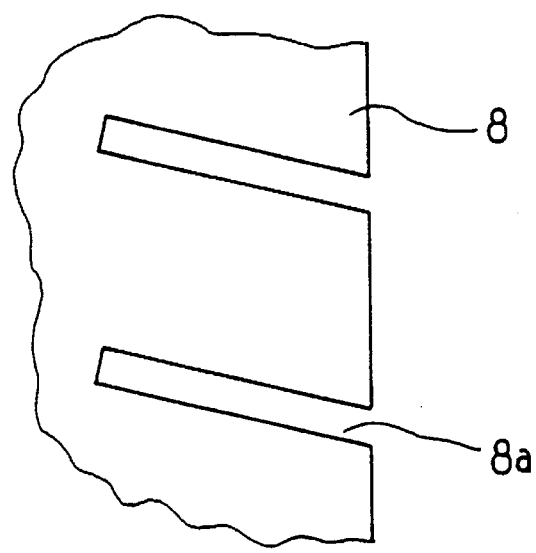
FIG. 36 is a development view of the slits used in the ninth embodiment.

In the ninth embodiment, the shape of the opening portion 8*a* was a simple slit, but this is not limited and can be a shape as illustrated in FIGS. 34 to 36. In FIG. 36 the opening portion shape was inclined in the axial direction, but this can also be a curved shape.

Figure 37:
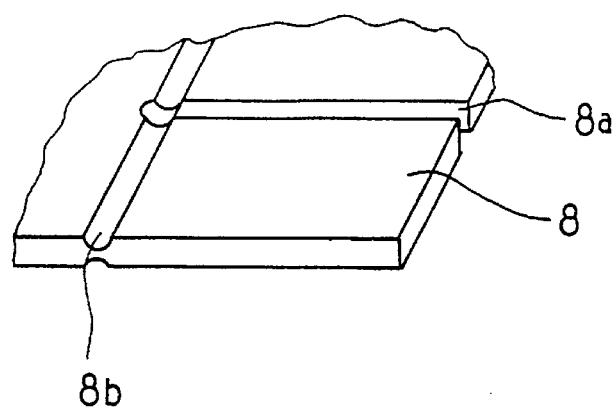
FIG. 37 is a development view of the slits used in the ninth embodiment.

In FIG. 37, in addition to the formation of the opening portion 8*a*, a groove portion 8*b* was formed in the circumferential direction to achieve the same effect as the above configuration.

(Tenth Embodiment)

In the first embodiment, flange 12 was provided on the outer casing 8 of the metal catalyst converter 1, and the structure was held and supported with this flange 12. However, in the tenth embodiment, a method for holding and fixing the structure by providing a flange 12 on the outer casing 8 will be described.

Figure 38:
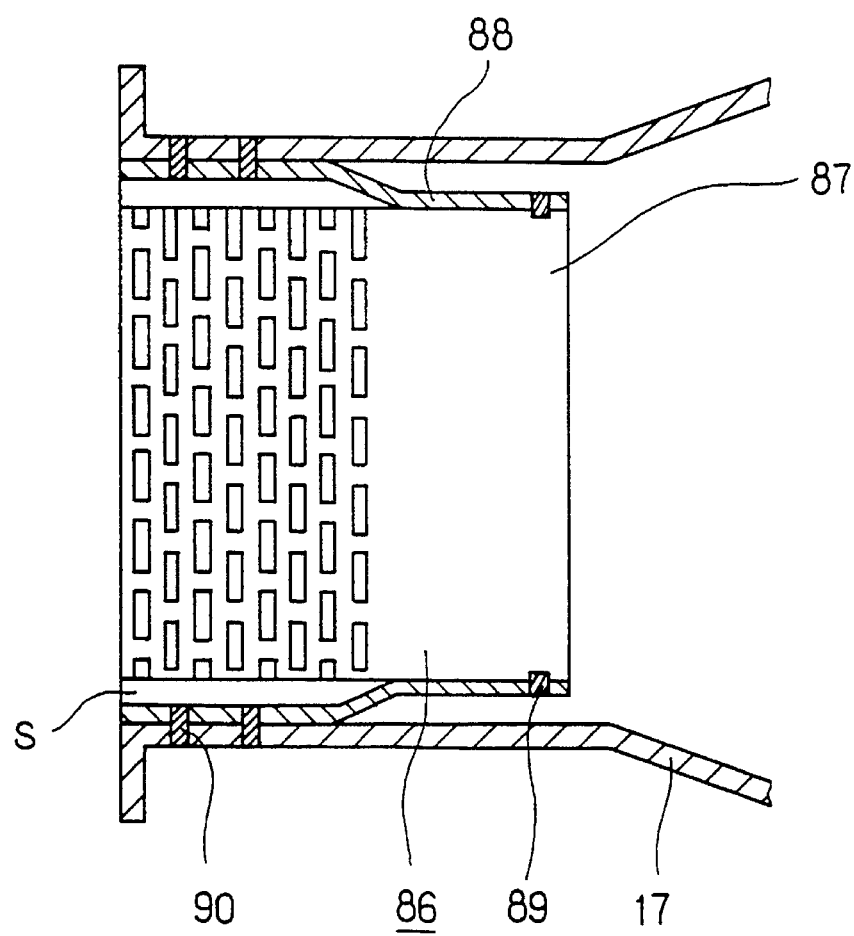
FIG. 38 is a partial cross-sectional view of the metal catalyst converter according to the nine embodiment.

FIG. 38 illustrates the metal catalyst converter 86 according to the tenth embodiment. In FIG. 38, numeral 17 is the outer casing for the start catalyst. The metal catalyst converter 86 is configured of the metal catalyst carrier 87 an outer casing 88 that does not have a flange to hold this metal catalyst carrier 87.

The outer casing 88 is welded and joined to the metal catalyst carrier 87 at welding point 89 at the downstream side of the exhaust gas passage. All or part of the upstream side of the exhaust gas passage in this outer casing 88, is welded by at least one point on the outer surface of the outer casing 88 within the axial direction range of the metal catalyst carrier 87 and space portion S. 90 indicates the welding point of the outer casing 88 and outer casing 17 for the start catalyst.

With the above configuration, the metal catalyst converter can be held and fixed without providing flanges on the outer casing, and the metal catalyst converter can be provided inexpensively.

The metal catalyst carriers and metal catalyst converters according to the present invention, can be incorporated to catalyst converters used without electrical conduction, and also for metal catalyst converters with a further outstanding temperature rise characteristics achieved by conducting the metal catalyst converter.

In concrete terms, metal catalyst carrier can be electrically conducted from the downstream side of the exhaust gas passage to the upstream side.

By incorporating the present invention, an inexpensive catalyst converter configured of a honeycomb body of which the temperature can be increased easily just with the heat of the exhaust gas and the catalyst carrier which holds the catalyst in the honeycomb body, which can raise the catalyst to the activation temperature in a short time, and which has sufficient strength can be provided.

What is claimed is:

1. A honeycomb body arranged in the exhaust gas passage of an engine, comprising;

at least one flat metal sheet;

at least one corrugated metal sheet superimposed with said flat metal sheet one over the other and defining a metal catalyst carrier having a plurality of axial gas passages to allow exhaust gas to flow axially from an upstream side to a downstream side of said gas passages, said flat metal sheet and said corrugated metal sheet each having an upstream portion and a downstream portion;

wherein said upstream portion is a low heat capacity area which is smaller in heat capacity than said downstream portion;

wherein said carrier is configured by alternately winding or laminating said at least one flat metal sheet and said at least one corrugated metal sheet, said low heat capacity area is configured of a slit matrix created by a plurality of rows of slits which are through-holes, and said rows of slits extend in a direction generally perpendicular to said gas passages.

2. The honeycomb body according to claim 1, wherein each of said slits has an approximate rhombus shape or an approximate rectangular shape of which length h extends in an axial direction of said metal carrier and of which length w extends in the direction perpendicular to the axial direction of the carrier body, and each slit's aspect ratio h:w is 1:5 or less, and wherein the carrier is supported substantially solely at one end thereof.

3. The honeycomb body according to claim 1, wherein adjacent slits in an axial direction of the metal catalyst carrier are offset by (W+D)/2, wherein W is the length of said slit in a direction perpendicular to the axial direction of the metal catalyst carrier and D is an interval between adjacent slits in said direction perpendicular to said axial direction.

4. The honeycomb body according to claim 1, said slit matrix is formed by arranging each said slit so that adjacent slits of said slits in an axial direction of said carrier have an interval H an adjacent slits of said slits in a direction perpendicular to said axial direction of said carrier have an interval D, and wherein each said slit in each row is arranged to establish the same positional relation to said axial direction of said carrier.

5. The honeycomb body according to claim 1, wherein an opening rate of said slit matrix is within the range of 30 to 50%.

6. The honeycomb body according to claim 1, wherein at least one of said flat metal sheet and said corrugated metal sheet has a non-slit matrix portion in which no slits are formed at the upstream side of said gas passages; and wherein said carrier is supported substantially solely at one end thereof.

7. The honeycomb body according to claim 6, wherein a length of said non-slit matrix is 3 to 5 mm is axial direction of said carrier.

8. The honeycomb body according to claim 6, wherein said non-slit matrix is arranged within the range of 5 to 60% of an axial length of said carrier from an upstream side end of said carrier to exhaust gas downstream side direction.

9. The metal carrier according to claim 6, wherein said flat sheet and said corrugated sheet are mutually joined substantially at said non-slit matrix portion at said upstream side of said gas passages.

10. A catalyst converter comprising:

a catalyst carrier arranged in an exhaust gas passage of an exhaust pipe from an engine wherein catalyst that causes an oxidation reduction reaction with toxic element in exhaust gas emitted from said engine is held in said catalyst carrier, and wherein the catalyst carrier defines a low heat capacity area only at an upstream side of said exhaust gas passage, said area being smaller in heat capacity than a downstream portion of said catalyst carrier at a downstream side of said exhaust passage, and wherein an outer casing having an air insulation layer at an area corresponding to said low heat capacity area of said catalyst carrier is formed; and wherein said low heat capacity area of said catalyst carrier has a matrix of slits having openings formed by a plurality of row of slits that extend in a direction generally perpendicular to a direction of exhaust gas glow in said exhaust passage.

11. The catalyst converter according to claim 10, wherein a plurality of openings are formed in a row on said outer casing with intervals in a circumferential direction on at least part of a portion of the outer casing that joins with said catalyst carrier, and wherein said openings on the outer casing can thermally deform in a direction that said catalyst carrier radially expands and contracts.

12. The catalyst converter according to claim 10, wherein said catalyst carrier is configured by alternately winding or laminating metal flat sheets and corrugated sheets.

13. The catalyst converter according to claim 12, wherein a portion of said flat sheet and corrugated sheet joined with said outer casing is a non-slit matrix portion downstream of said slit matrix.

14. The catalyst converter according to claim 10, wherein said air insulation layer has a space that is 2 mm or more from foremost downstream side of said slit matrix to the axial downstream side of said catalyst carrier.

15. The honeycomb body according to claim 10, wherein each of said slits has an approximate rhombus shape or an approximate rectangular shape of which length h extends in an axial direction of said metal carrier and of which length W extends in the direction perpendicular to the axial direction of the carrier, and each slit's aspect ratio h:W is 1.5 or less, and wherein the carrier is supported substantially solely at one end thereof.

16. The honeycomb body according to claim 10, wherein adjacent slits in the direction perpendicular to the axial direction are offset by (W+D)/2, wherein W is the length of said slit in a direction perpendicular to an axial direction of the metal catalyst carrier and D is an interval of adjacent slits arranged in a direction perpendicular to said axial direction.

17. The honeycomb body according to claim 10, said slit matrix is formed by arranging each said slit so that adjacent slits of said plurality of slits in an axial direction of said carrier have an interval H and adjacent slits of plurality of slits in a direction perpendicular to said axial direction of said carrier have an interval D, and wherein each said slit in each row is arranged to establish the same positional relation to said axial direction of said carrier.

18. The catalyst converter according to claim 10, wherein an opening rate of said slit matrix is within the range of 30 to 50%.

19. The catalyst converter according to claim 18, wherein said catalyst carrier is configured by alternately winding or laminating metal flat sheets and corrugated sheets.

20. The catalyst converter according to claim 15, wherein a radial length of said air insulation layer formed between said slit matrix and said outer casing is less than the corrugation height of said corrugated sheets that form said catalyst carrier.

21. The catalyst converter according to claim 15, wherein a non-slit matrix portion is formed at an upstream side end of said flat sheet and corrugated sheet or at a foremost front end of said slit matrix, the metal flat sheet and corrugated sheet being joined substantially at said non-slit matrix portion.

22. The catalyst converter according to claim 21, wherein said non-slit matrix portion arranged at the upstream side end of said flat sheet and corrugated sheet is a length of 3 to 5 mm in the axial direction of said carrier.

23. The catalyst converter according to claim 21, wherein said non-slit matrix portion is arranged within the range of 5 to 60% of an axial length of said carrier from an upstream side end of said carrier to exhaust gas downstream side direction.

24. The catalyst converter according to claim 21, wherein only said non-slit matrix portion of said flat sheet and corrugated sheet is mutually joined; and wherein said carrier is supported substantially solely at one end thereof.

25. The catalyst converter according to claim 10, wherein said outer casing is joined with said catalyst carrier at a portion other than said matrix of slits, on a downstream side of said catalyst carrier.

26. The catalyst converter according to claim 10, wherein said outer casing is joined with said catalyst carrier adjacent to a downstream side of said catalyst carrier.

27. The catalyst converter according to claim 10, further comprising:

a outer casing flange of which one end is connected to an upstream side of said outer casing, an other end of the flange is fit between a pair of flanges projecting from the exhaust pipe so that said catalyst carrier is stored in the exhaust pipe by said outer casing flange.

28. The catalyst converter according to claim 10, wherein said catalyst carrier is stored in the exhaust pipe by joining the outer casing to an inner surface of the exhaust pipe adjacent to an upstream end of said outer casing.

* * * * *

UNITED STATES PATENT AND TRADEMARK OFFICE
CERTIFICATE OF CORRECTION

PATENT NO. : 5,599,509
DATED : February 4, 1997
INVENTOR(S) : TOYAO et al.

It is certified that error appears in the above-indentified patent and that said Letters Patent is hereby corrected as shown below:

On the title page, item "[*] Notice: The portion of the term ...Disclaimed." to --[*] Notice: The term of this patent shall not extend beyond the expiration date of Pat. No. 5,648,050.--

Signed and Sealed this

Eighteenth Day of November 1997

Attest:

BRUCE LEHMAN

*Attesting Officer*     *Commissioner of Patents and Trademarks*